(12) United States Patent
Pondelick et al.

(10) Patent No.: US 8,291,525 B2
(45) Date of Patent: Oct. 23, 2012

(54) VACUUM WASTE SYSTEM AND METHOD FOR USING THE SAME

(75) Inventors: Mark A. Pondelick, Rockford, IL (US); Christopher Hardwick, Roscoe, IL (US); Thao Hoang, Rockford, IL (US); Steven Whisler, San Juan Capistrano, CA (US)

(73) Assignee: B/E Aerospace, Inc., Wellington, FL (US)

( * ) Notice: Subject to any disclaimer, the term of this patent is extended or adjusted under 35 U.S.C. 154(b) by 605 days.

(21) Appl. No.: 12/565,932

(22) Filed: Sep. 24, 2009

(65) Prior Publication Data

US 2010/0083433 A1     Apr. 8, 2010

Related U.S. Application Data

(60) Provisional application No. 61/102,812, filed on Oct. 3, 2008.

(51) Int. Cl.
*E03D 11/00* (2006.01)

(52) U.S. Cl. .................................. 4/252.1; 4/431; 4/316

(58) Field of Classification Search .............. 4/431–433, 4/252.1–252.5, 321–323; 248/146, 150, 248/151, 154, 127, 176.1, 188.1, 220.21, 248/225.21, 223.41, 224.61; 220/628, 630, 220/631, 633, 635, 638; 52/169.7; 24/697.2; 211/71.01, 79, 85
See application file for complete search history.

(56) References Cited

U.S. PATENT DOCUMENTS

| | | | |
|---|---|---|---|
| 3,411,162 A | 11/1968 | Palmer | |
| 3,587,896 A * | 6/1971 | Graff | 215/206 |
| 3,939,500 A | 2/1976 | Miller et al. | |
| 4,041,554 A | 8/1977 | Gregory et al. | |
| 4,348,776 A * | 9/1982 | Sarjeant | 4/300.3 |
| 4,546,502 A | 10/1985 | Lew | |
| 4,550,455 A * | 11/1985 | Carson et al. | 4/480 |
| 5,031,575 A * | 7/1991 | Phillips | 119/61.53 |
| 5,231,706 A | 8/1993 | Kendall | |
| 5,271,105 A | 12/1993 | Tyler | |
| 5,604,938 A | 2/1997 | Tyler | |
| 5,909,968 A | 6/1999 | Olin et al. | |
| 5,956,780 A * | 9/1999 | Tyler | 4/321 |
| 6,189,161 B1 * | 2/2001 | Rijn et al. | 4/321 |
| 6,212,700 B1 | 4/2001 | Giesler et al. | |
| 6,223,357 B1 | 5/2001 | Claas | |
| 6,295,771 B1 * | 10/2001 | Desjoyaux et al. | 52/169.7 |
| 6,347,416 B1 | 2/2002 | Anderson et al. | |

(Continued)

FOREIGN PATENT DOCUMENTS

EP     1 818 462 A1     8/2007

(Continued)

*Primary Examiner* — Gregory Huson
*Assistant Examiner* — Christine Skubinna
(74) *Attorney, Agent, or Firm* — Drinker Biddle & Reath LLP

(57) ABSTRACT

A vacuum waste system for use in a vehicle, such as a aircraft. The vacuum waste system includes a lightweight base assembly and a lightweight toilet bowl assembly mounted to the top of the base assembly. The toilet bowl assembly has downwardly extending members that engage in a sliding manner with horizontally extending members at the top of the base assembly to thus secure the toilet bowl assembly to the base assembly. A fastener, such as a nut and bolt assembly, can be coupled to the toilet bowl assembly and base assembly using a tool to thus secure the toilet bowl assembly to the base assembly.

25 Claims, 34 Drawing Sheets

U.S. PATENT DOCUMENTS

| | | |
|---|---|---|
| 6,536,054 B2 | 3/2003 | Anderson et al. |
| 6,536,055 B2 | 3/2003 | Pondelick et al. |
| 6,802,168 B1 * | 10/2004 | Minnick .................. 52/592.1 |
| 6,977,005 B2 | 12/2005 | Erdmann et al. |
| 7,765,625 B2 * | 8/2010 | Durrani et al. ............. 4/252.1 |
| 7,861,647 B2 * | 1/2011 | So et al. ..................... 99/339 |
| 2007/0266490 A1 * | 11/2007 | Foy ............................. 4/513 |
| 2008/0168597 A1 * | 7/2008 | Bartlett ........................ 4/321 |

FOREIGN PATENT DOCUMENTS

WO    WO 2008/010570 A1    1/2008

\* cited by examiner

VACUUM WASTE SYSTEM AND METHOD FOR USING THE SAME

CROSS-REFERENCE TO RELATED PATENT APPLICATION

This patent application claims the benefit of U.S. Provisional Patent Application No. 61/102,812, filed Oct. 3, 2008.

FIELD OF THE INVENTION

The present invention generally relates to a vacuum waste system. More particularly, the present invention relates to a vacuum waste system for use in a vehicle, such as a aircraft.

BACKGROUND OF THE INVENTION

Vacuum waste systems are generally known in the art for use in transportation vehicles such as aircraft. Vacuum waste systems typically comprise a toilet bowl connected by vacuum piping to a waste tank. A flush valve is disposed between the toilet and the vacuum piping. When the flush valve opens, the contents of the toilet bowl are removed by differential pressure to the waste tank because the air pressure in the line under vacuum is lower than ambient air pressure in a toilet bowl. The flush valve maintains the pressure boundary between ambient air in the toilet bowl and the lower pressure of the piping and the waste tank. In an aircraft, the piping may be placed under vacuum pressure at altitudes under about 16,000 feet by a vacuum source. At altitudes about 16,000 feet and above, the vacuum pressure in the piping may be supplied by the atmospheric pressure differential between the cabin and the exterior of the airplane.

Conventional vacuum waste systems generally consist of a frame structure and a toilet bowl that is mounted in the frame structure. These frame structures can be large and heavy, and thus add unnecessary weight to the aircraft. For example, the frame structures can have the typical height of a toilet, with the toilet bowl assembly being mounted in the frame structure. This additional frame structure needed to support the toilet bowl at a standard height adds weight to the aircraft, which naturally has a negatively impact on fuel efficiency that can add up over many flights and result in significant additional yearly fuel costs to the airline, especially for a fleet of aircraft having such conventional vacuum waste systems. Furthermore, conventional waste systems can be configured to allow the toilet bowls to be removed without a tool, thus making them more prone to tampering.

A need therefore exists for a more effective and efficient vacuum waste system.

BRIEF SUMMARY OF THE INVENTION

An exemplary embodiment of the present invention provides a vacuum waste system for use in a vehicle, such as a aircraft. The exemplary vacuum waste system includes a lightweight base assembly and a lightweight toilet bowl assembly mounted to the top of the base assembly. The toilet bowl assembly can have a downwardly extending members that engage in a sliding manner with horizontally extending members at the top of the base assembly to thus secure the toilet bowl assembly to the base assembly. A fastener, such as a nut and bolt assembly, can be coupled to the toilet bowl assembly and base assembly using a tool to thus secure the toilet bowl assembly to the base assembly.

As described in more detail herein, a vacuum waste assembly according to an exemplary embodiment of the present invention comprises a base assembly and a toilet bowl assembly. The base assembly can be removably mounted to a base plate that is secured in the vehicle. For example, the base plate can have recesses for receiving extensions on the base assembly which act to removably secure the base assembly to the base plate. Furthermore, the base assembly can include a plurality of bayonet mounts, or any other suitable type of fastener, that engage with openings in the base plate to removably lock the base assembly to the base plate as understood in the art. The base assembly comprising at least one side wall having a vertically extending wall extending from a top surface of the side wall, with the vertically extending wall having a plurality of horizontally extending members extending therefrom. The horizontally extending members being positioned such that respective spaces are formed between the horizontally extending members. The toilet bowl assembly has a toilet bowl and a plurality of downwardly extending members extending therefrom, with each of the downwardly extending members having a gap therein. When the toilet bowl assembly is mounted to the base assembly, a respective one of the horizontally extending members is received into a respective said gap to thus removably secure the toilet bowl assembly to the base assembly. A fastening member that is operated by a tool can be used to further secure the toilet bowl assembly to the base assembly.

BRIEF DESCRIPTION OF THE DRAWINGS

These and other advantages of the invention will be apparent from the description of the invention provided herein with reference to the attached drawings in which.

DETAILED DESCRIPTION OF THE EMBODIMENTS

Figure 1:
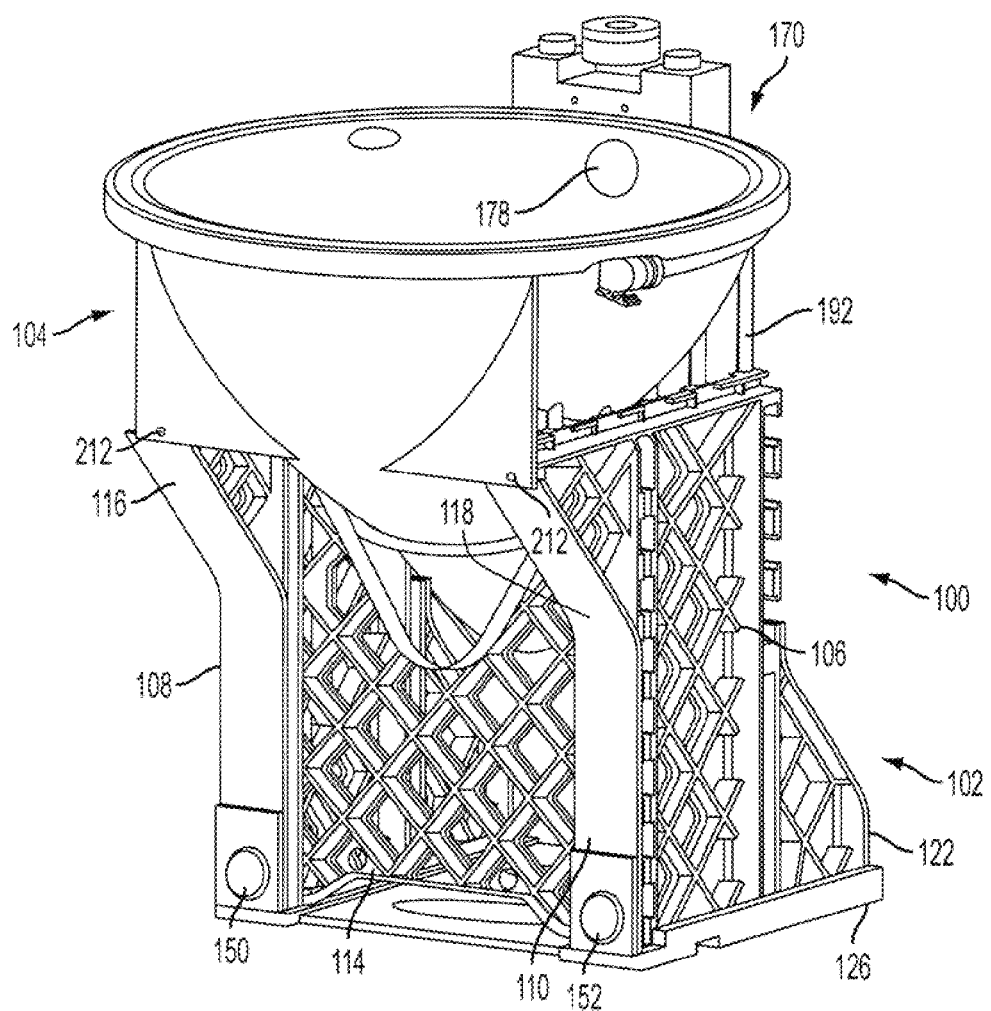
FIG. 1 is a front perspective view of a vacuum waste system according to an embodiment of the present invention.
Figure 2:
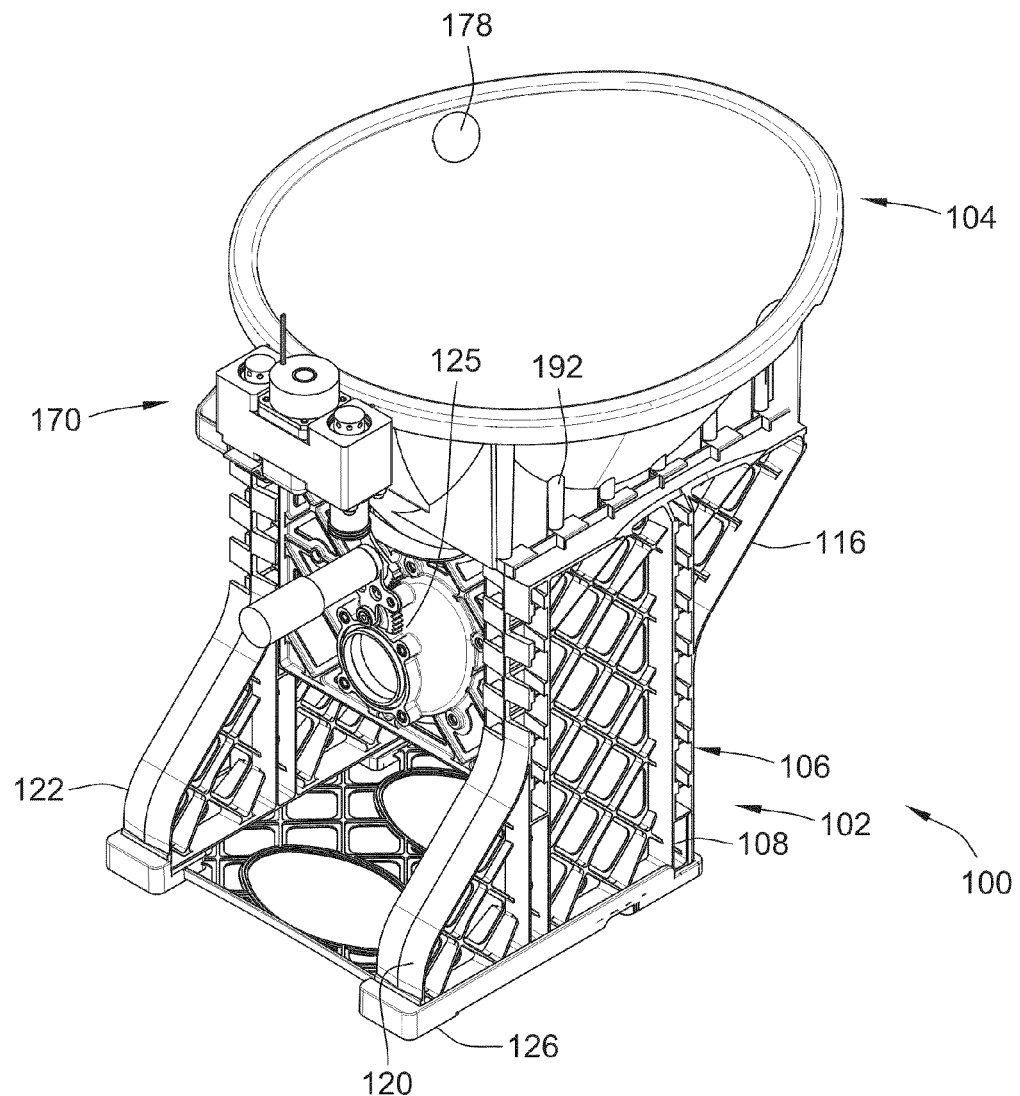
FIG. 2 is a rear perspective view of the vacuum waste system shown in FIG. 1.
Figure 3:
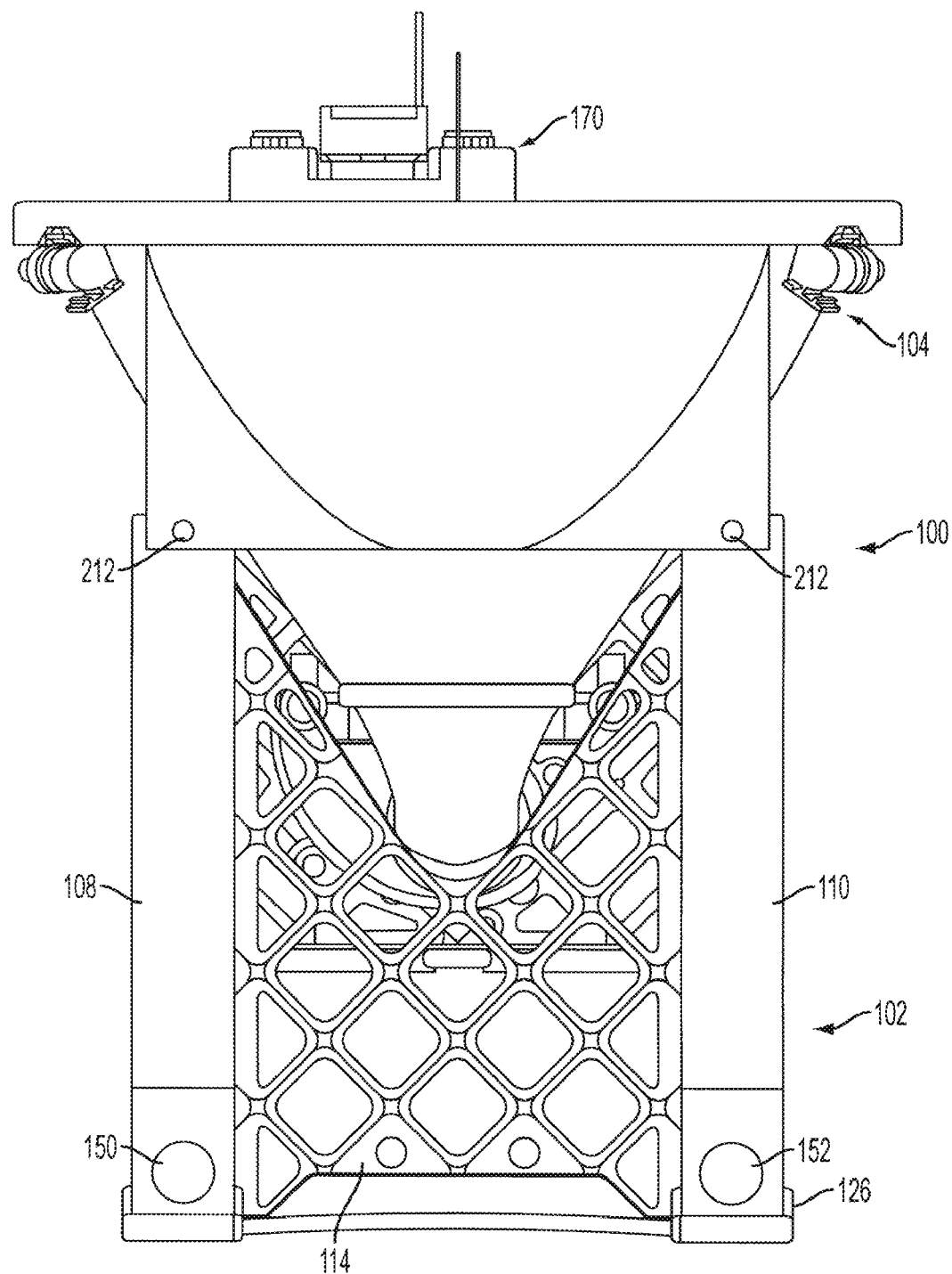
FIG. 3 is a front view of the vacuum waste system shown in FIG. 1.
Figure 4:
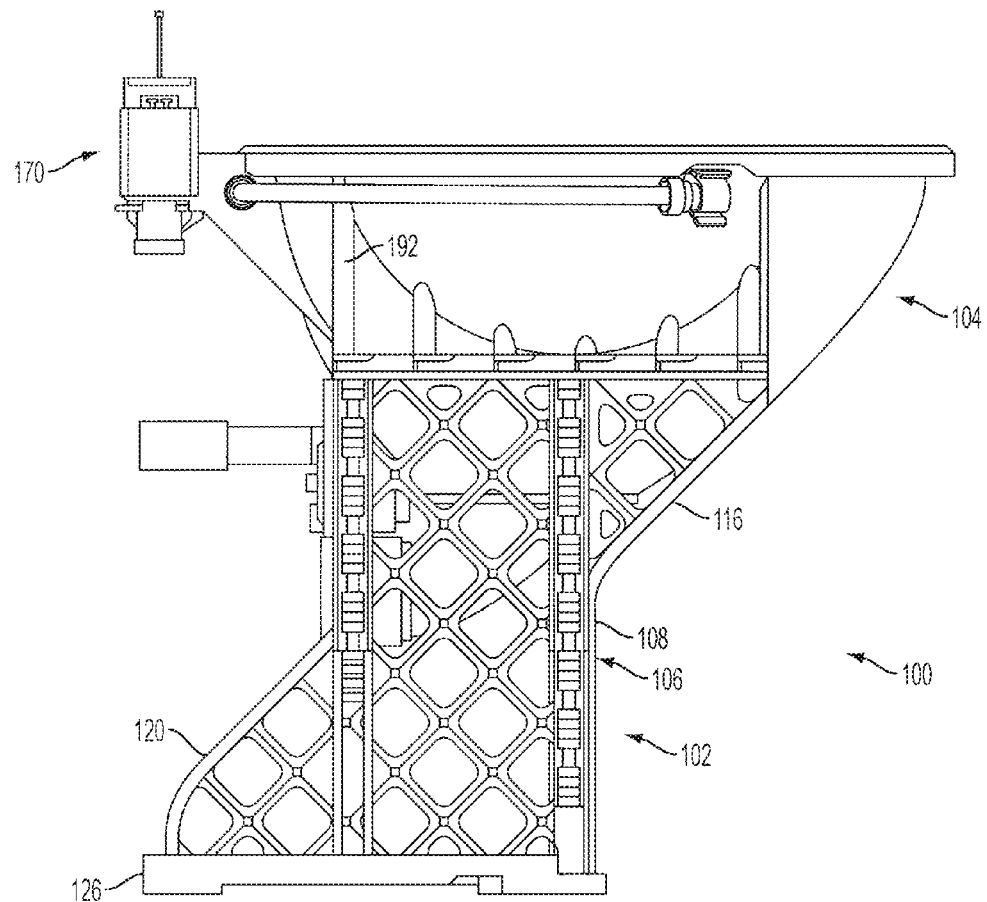
FIG. 4 is a side view of the vacuum waste system shown in FIG. 1.
Figure 5:
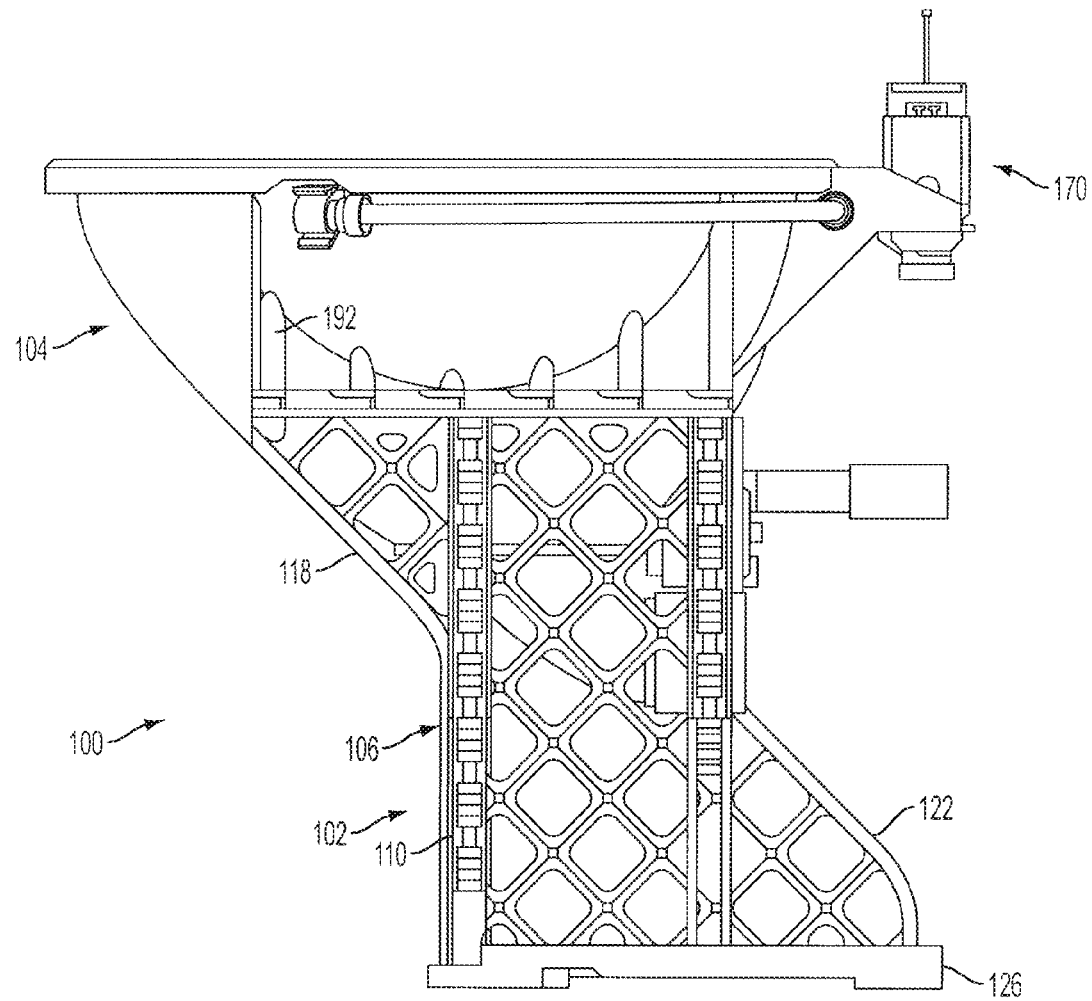
FIG. 5 is another side view of the vacuum waste system shown in FIG. 1.
Figure 6:
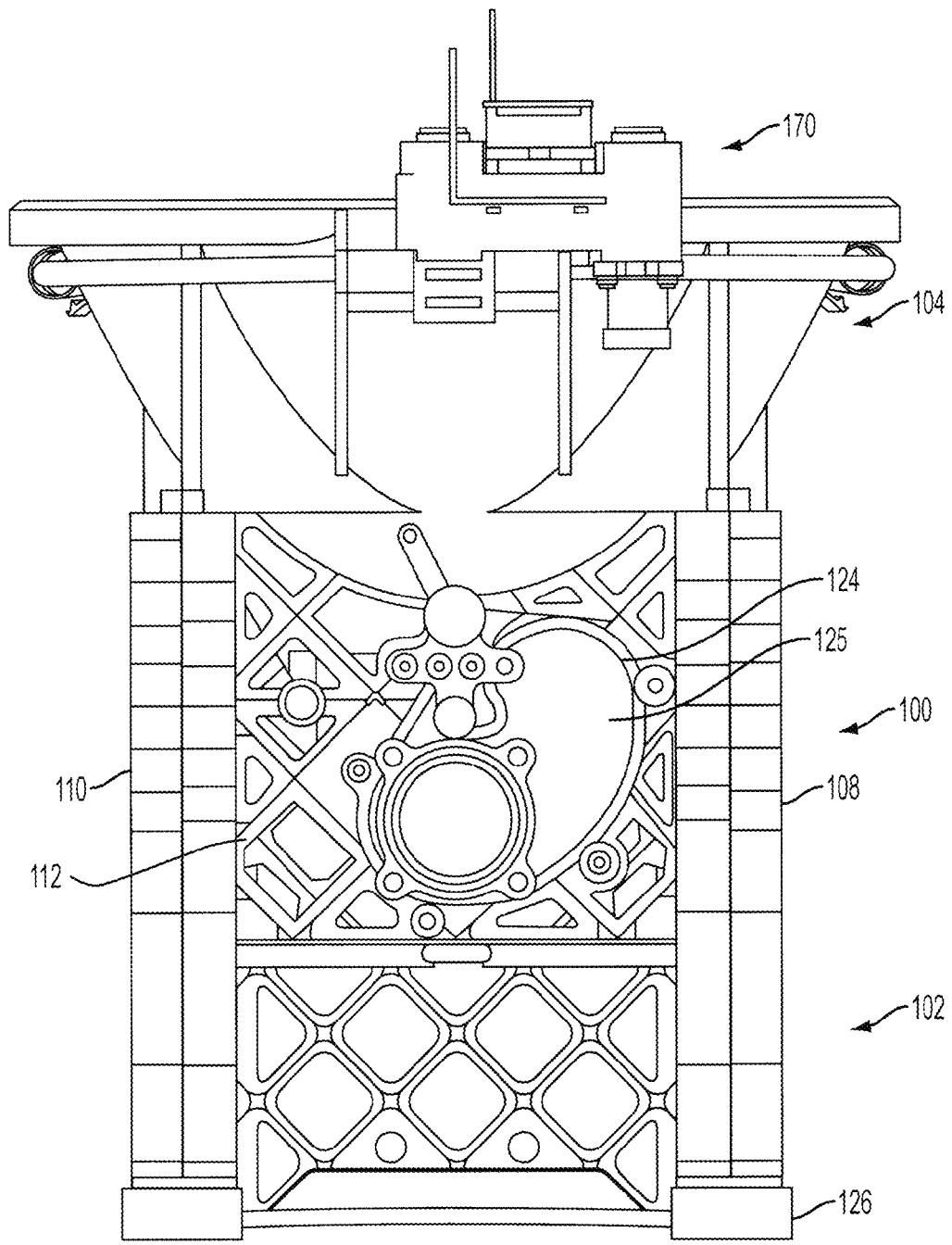
FIG. 6 is a rear view of the vacuum waste system shown in FIG. 1.
Figure 7:
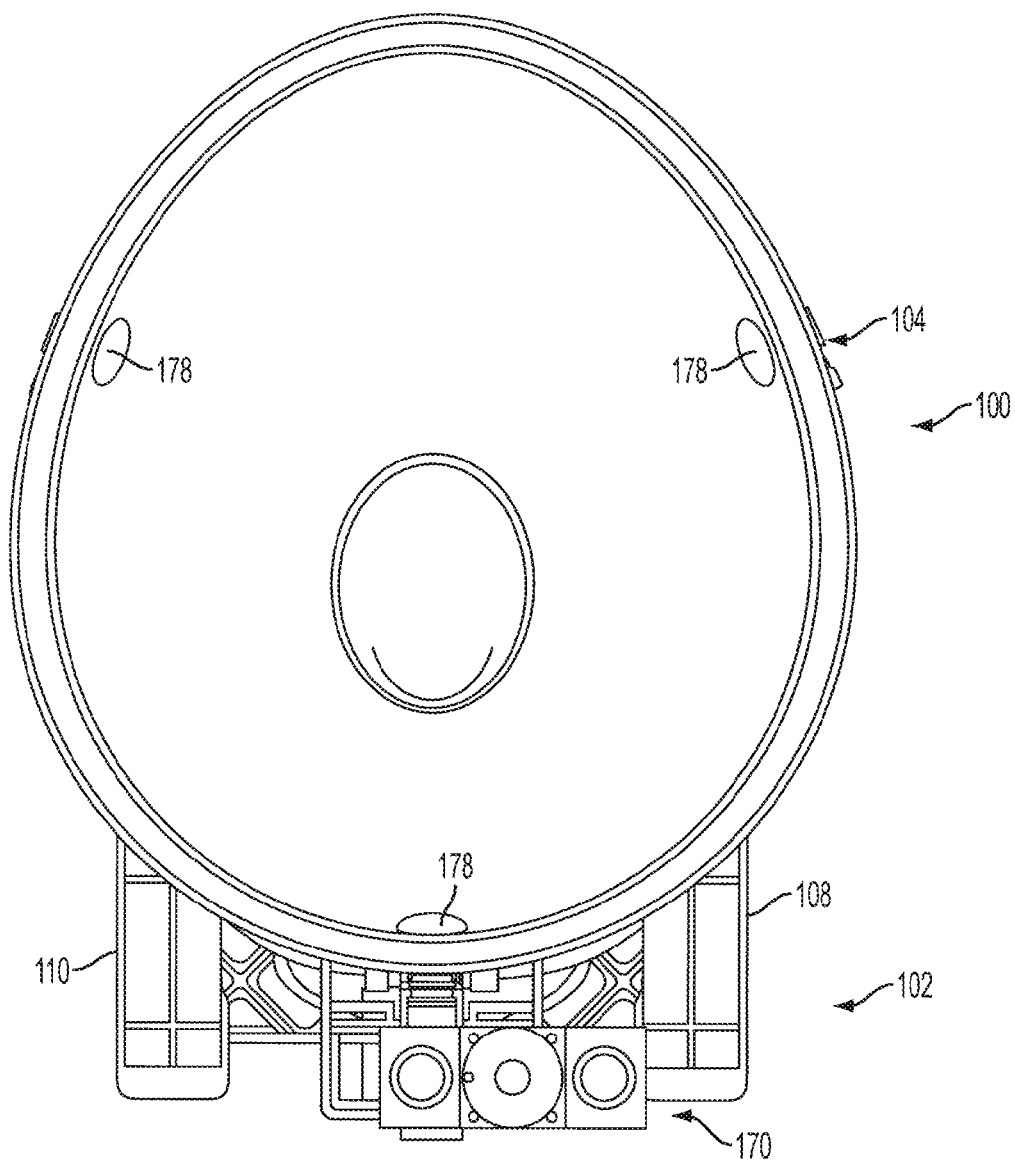
FIG. 7 is a top view of the vacuum waste system shown in FIG. 1.
Figure 8:
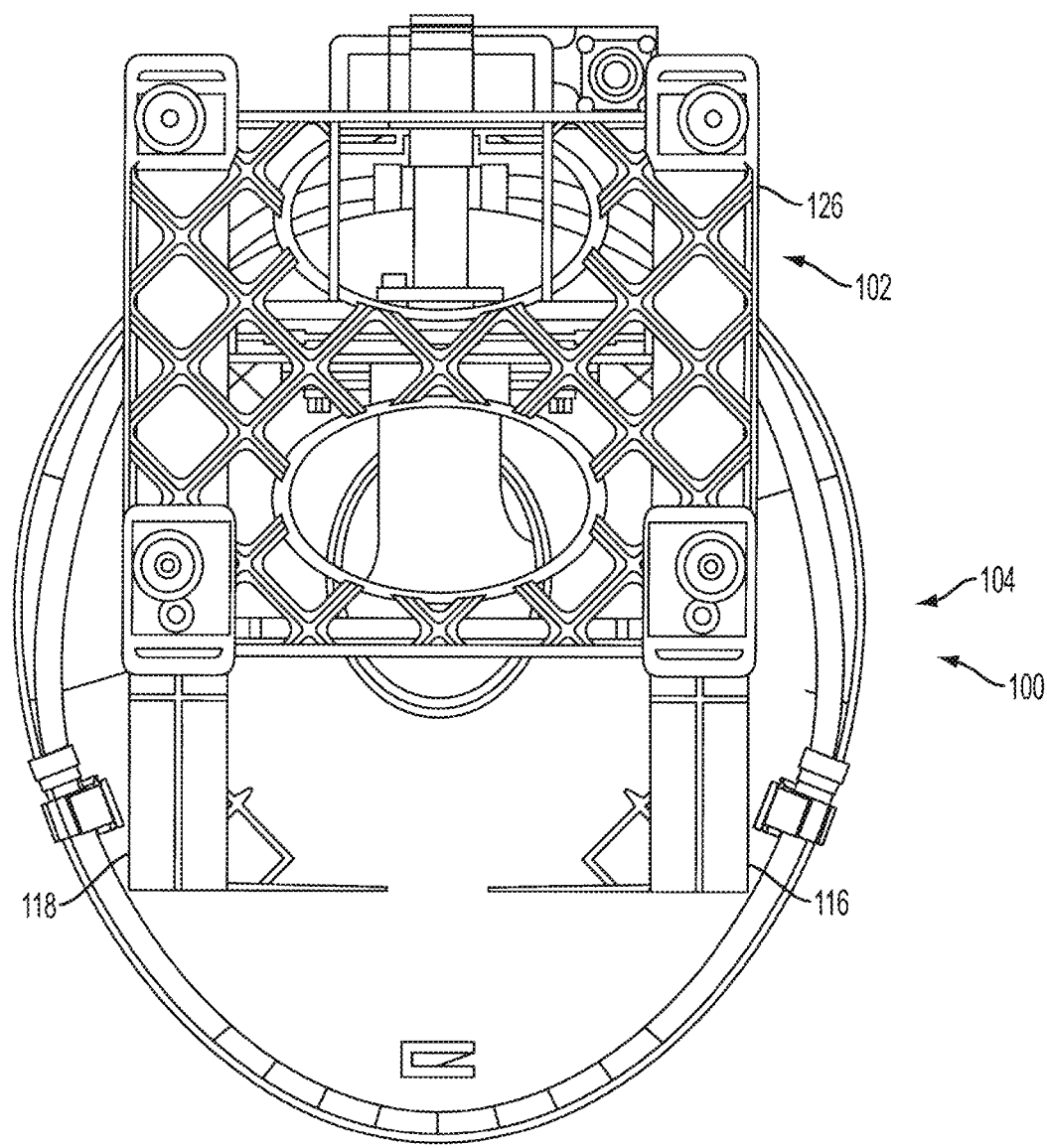
FIG. 8 is a bottom view of the vacuum waste system shown in FIG. 1.
Figure 9:
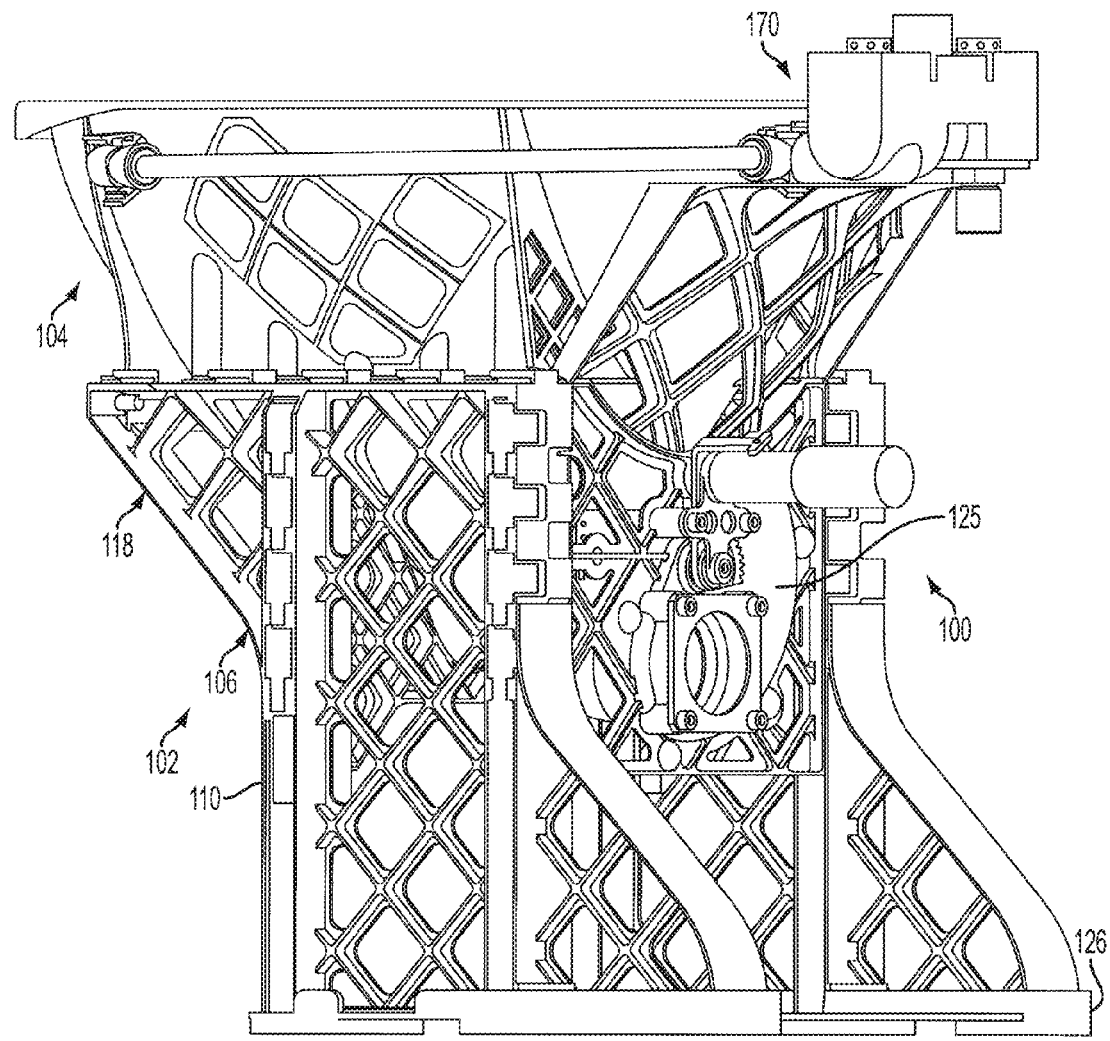
FIG. 9 is a detailed rear perspective view of the vacuum waste system shown in FIG. 1.
Figure 10:
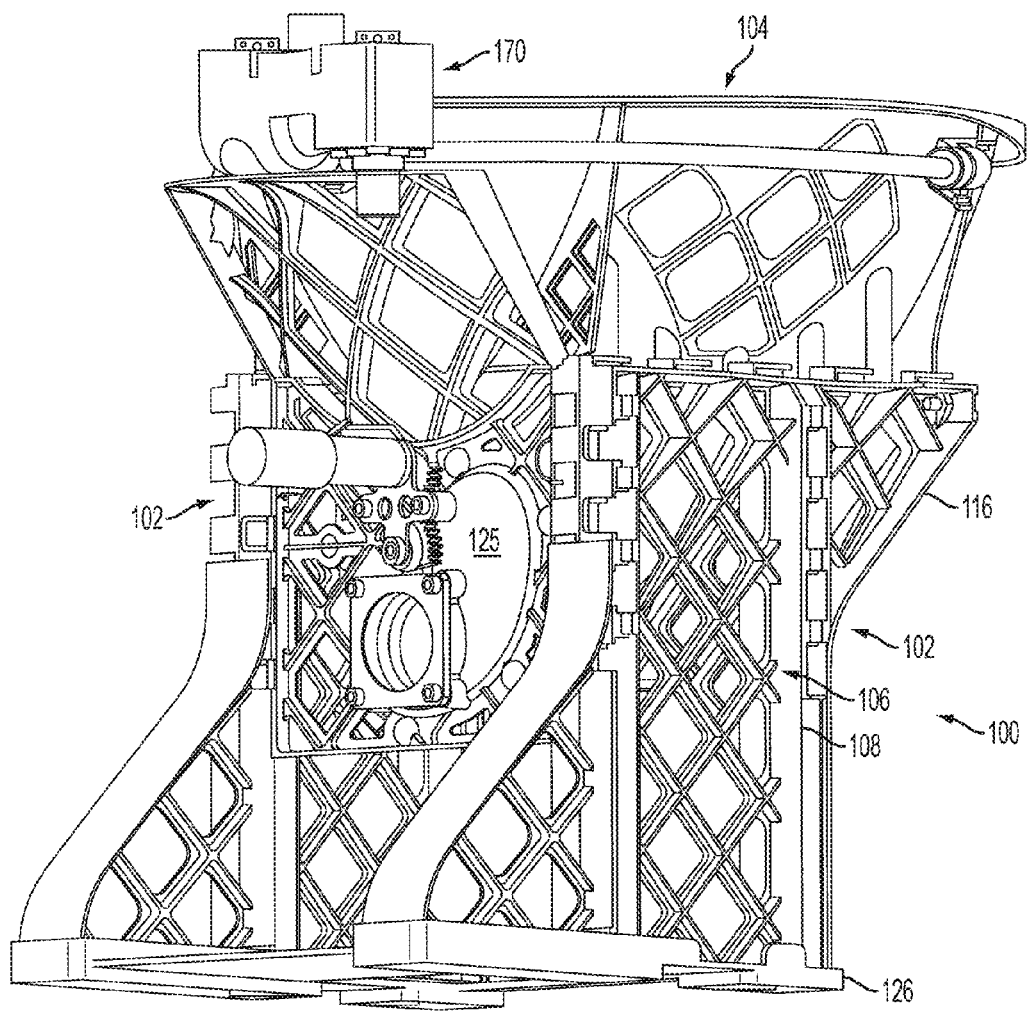
FIG. 10 is another detailed rear perspective view of the vacuum waste system shown in FIG. 1.
Figure 11:
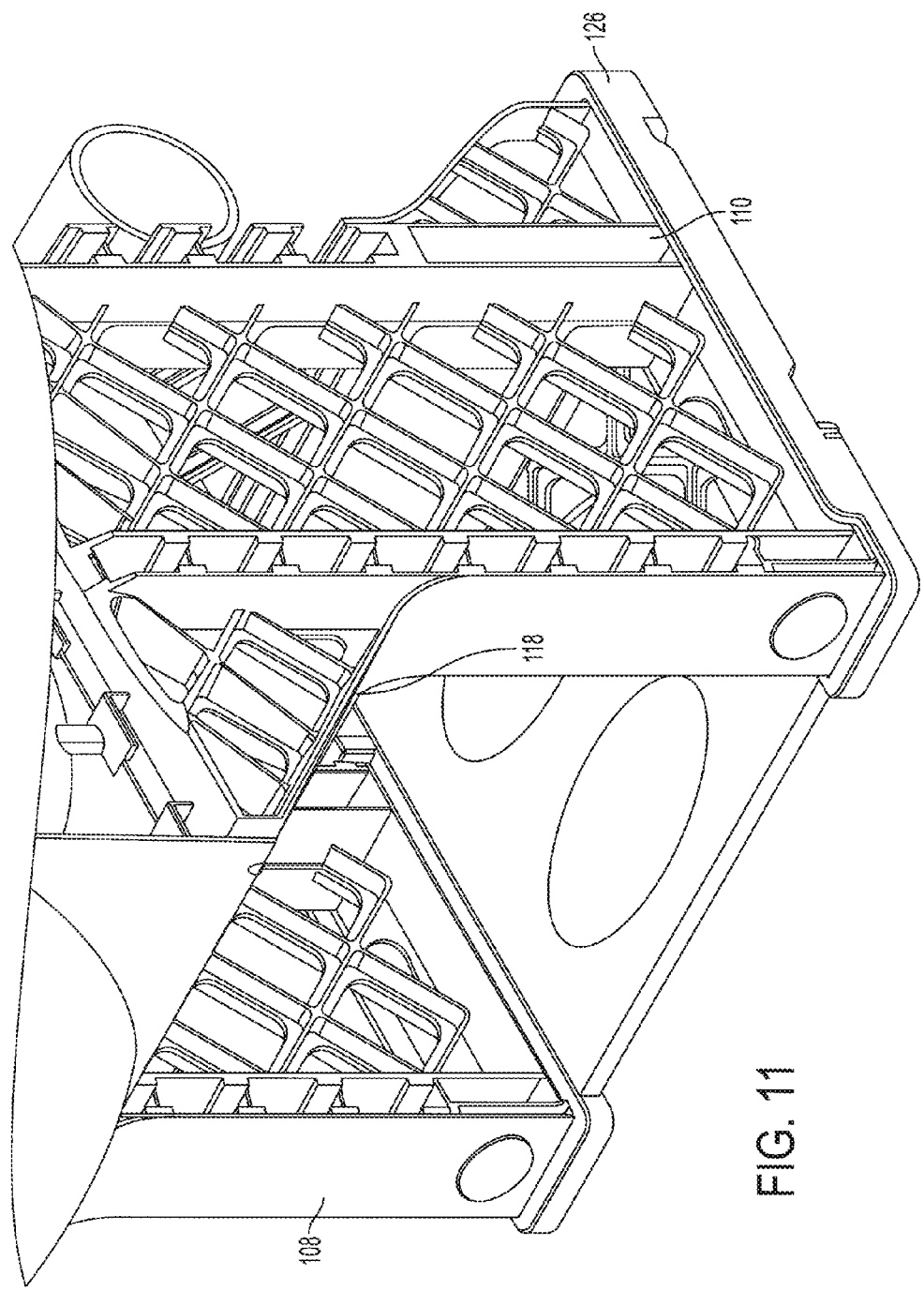
FIG. 11 is a detailed front perspective view of the base assembly of the vacuum waste system shown in FIG. 1.

The embodiments of the invention described below are not intended to be exhaustive or to limit the invention to the precise structure and operation disclosed. Rather, the embodiments described in detail below have been chosen and described to explain the principles of the invention and its application, operation and use in order to best enable others skilled in the art to follow its teachings.

FIGS. 1-8 illustrate an exemplary vacuum waste system 100 according to an embodiment of the present invention. The vacuum waste system 100 can be installed in a vehicle and, in particular, an aircraft. As shown, the vacuum waste system 100 includes a base assembly 102 and a bowl assembly 104 that is removably mounted to the base assembly 102. The base assembly 102 and bowl assembly 104 can be made of a composite material, plastic, metal or any other suitable material. It is desirable for the base assembly 102 and bowl assembly 104 to be as compact as lightweight as possible to thus have as little impact on the overall weight of the aircraft as possible, thereby having less negative impact on the fuel efficiency of the aircraft.

As shown in FIGS. 1-8 and in more detail in FIGS. 9-17, the base assembly 102 includes a frame structure 106 which can be configured as a lattice-type structure to thus provide sufficient support while also reducing the overall weight of the base assembly 102. The frame structure 106 can include side walls 108 and 110, a rear wall 112 and a front wall 114 that can be coupled together by, for example, snap fitting or by any suitable fastening mechanisms. Side walls 108 and 110 include forward extending structures 116 and 118, respectively, that provide additional support for the bowl assembly 104, and rearward extending structures 120 and 122, respectively, that provide additional support for the overall base assembly 102. In an alternative embodiment of the vacuum waste system 100 illustrated in FIGS. 33-34, the rearward extending structures 120 and 122 may be eliminated. In this embodiment, the side walls 108, 110 may include forward extending structures 116 and 118. In an embodiment, a flush valve assembly 125 may be built-in to the rear wall 112 of the base assembly 102 in a mounting area 124 as described in copending U.S. patent application entitled "Flush Valve and Vacuum Generator for Vacuum Waste System," Ser. No. 61/102,674, filed Oct. 3, 2008, the entire contents of which being incorporated herein by reference.

As shown in more detail in FIGS. 12-15, the vacuum waste system 100 further includes a mounting member 126 (for example, a base plate) that is secured to the vehicle, such as an aircraft, by screws, bolts, rivets or any other suitable type of fasteners. The mounting member 126 includes mounting portions 128 and 130 with which the side walls 108 and 110, respectively, removably mate to secure the base assembly 102, and thus the entire vacuum waste system 100, to the vehicle. As illustrated in this example, side walls 108 and 110 include mounting extensions 132 and 134, respectively. The mounting portions 128 and 130 include recesses 136 and 138 with which mounting extensions 132 and 134 can removably mate.

Figure 12:
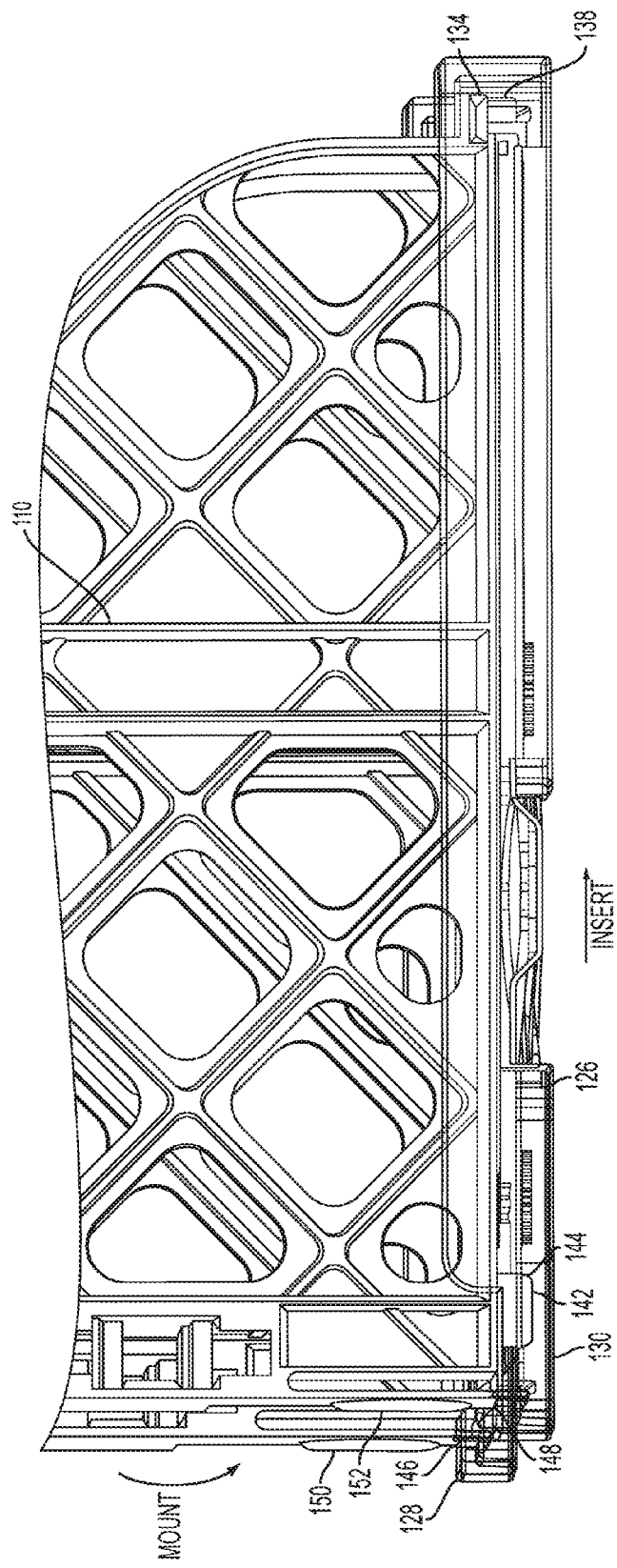
FIG. 12 is a further detailed view of the mounting structure of the base assembly of the vacuum waste system shown in FIG. 1.
Figure 13:
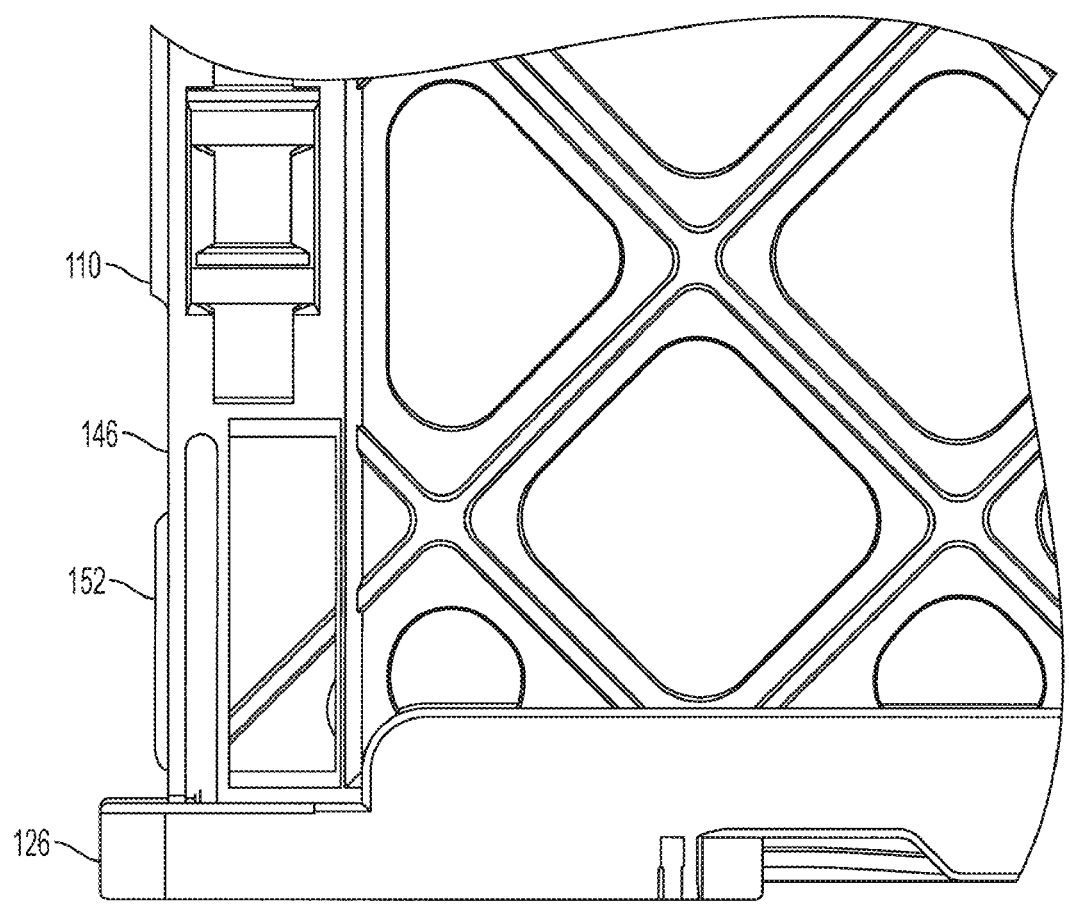
FIG. 13 is a detailed view of the front end of the mounting structure of the base assembly of the vacuum waste system shown in FIG. 1.
Figure 14:
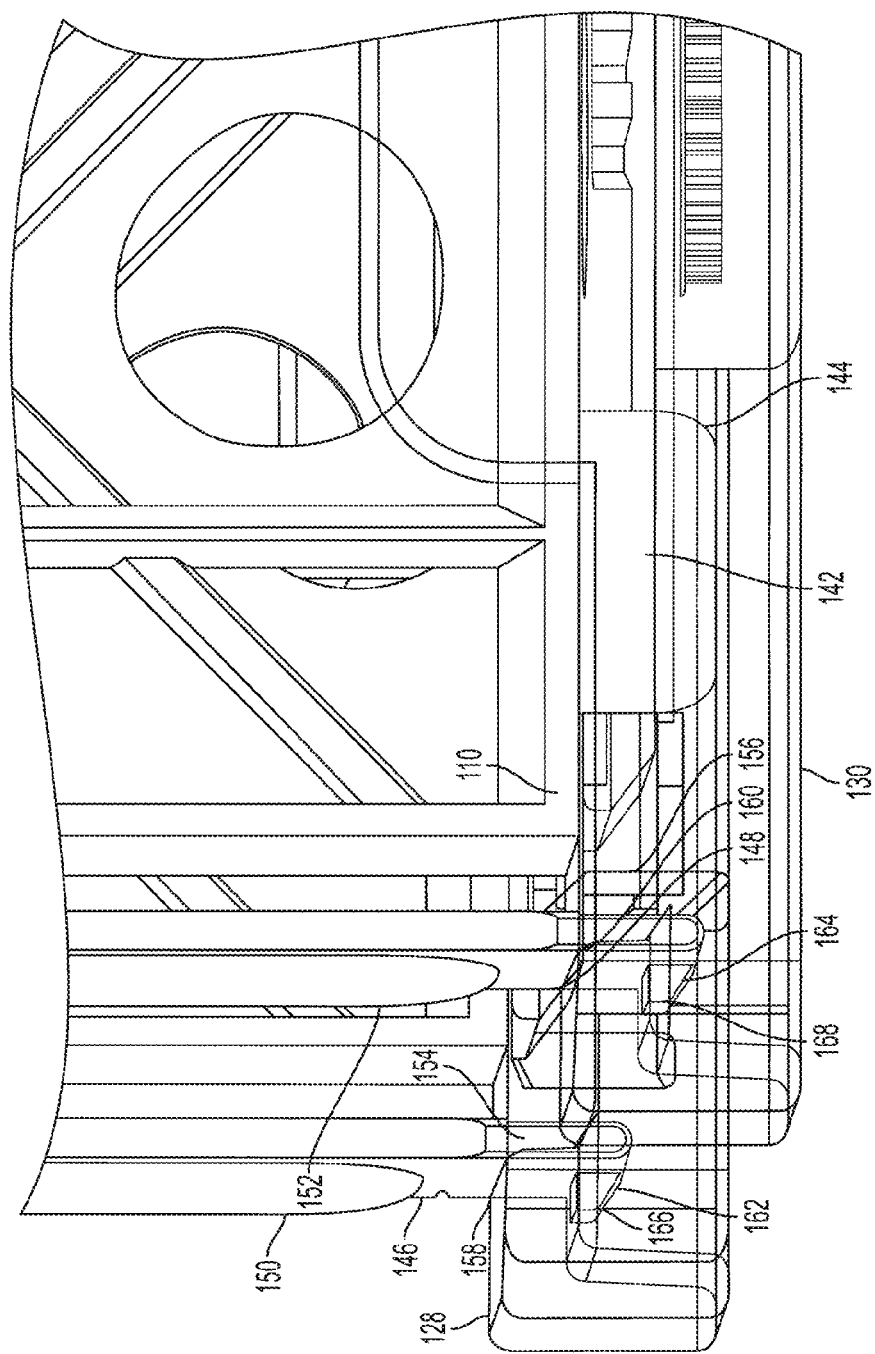
FIG. 14 is a further detailed view of the front end of the mounting structure of the base assembly of the vacuum waste system shown in FIG. 1, with a portion of the mounting structure shown in phantom.
Figure 15:
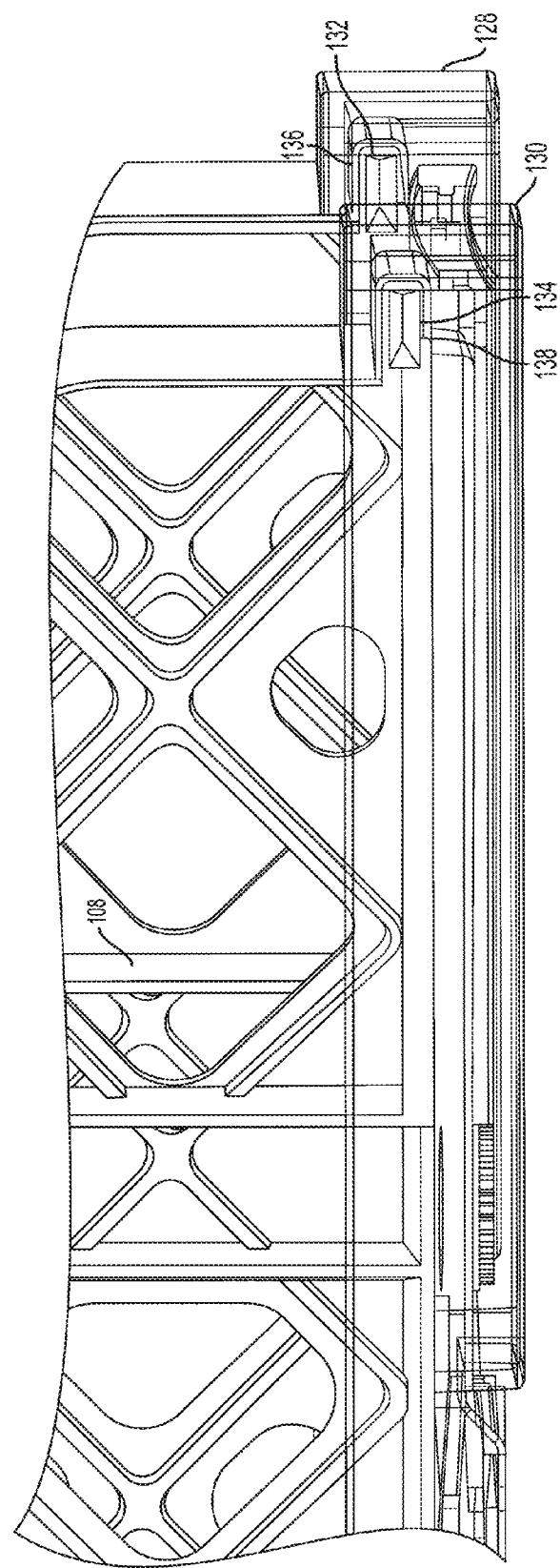
FIG. 15 is a further detailed view of the back end of the mounting structure of the base assembly of the vacuum waste system shown in FIG. 1, with a portion of the mounting structure shown in phantom.
Figure 16:
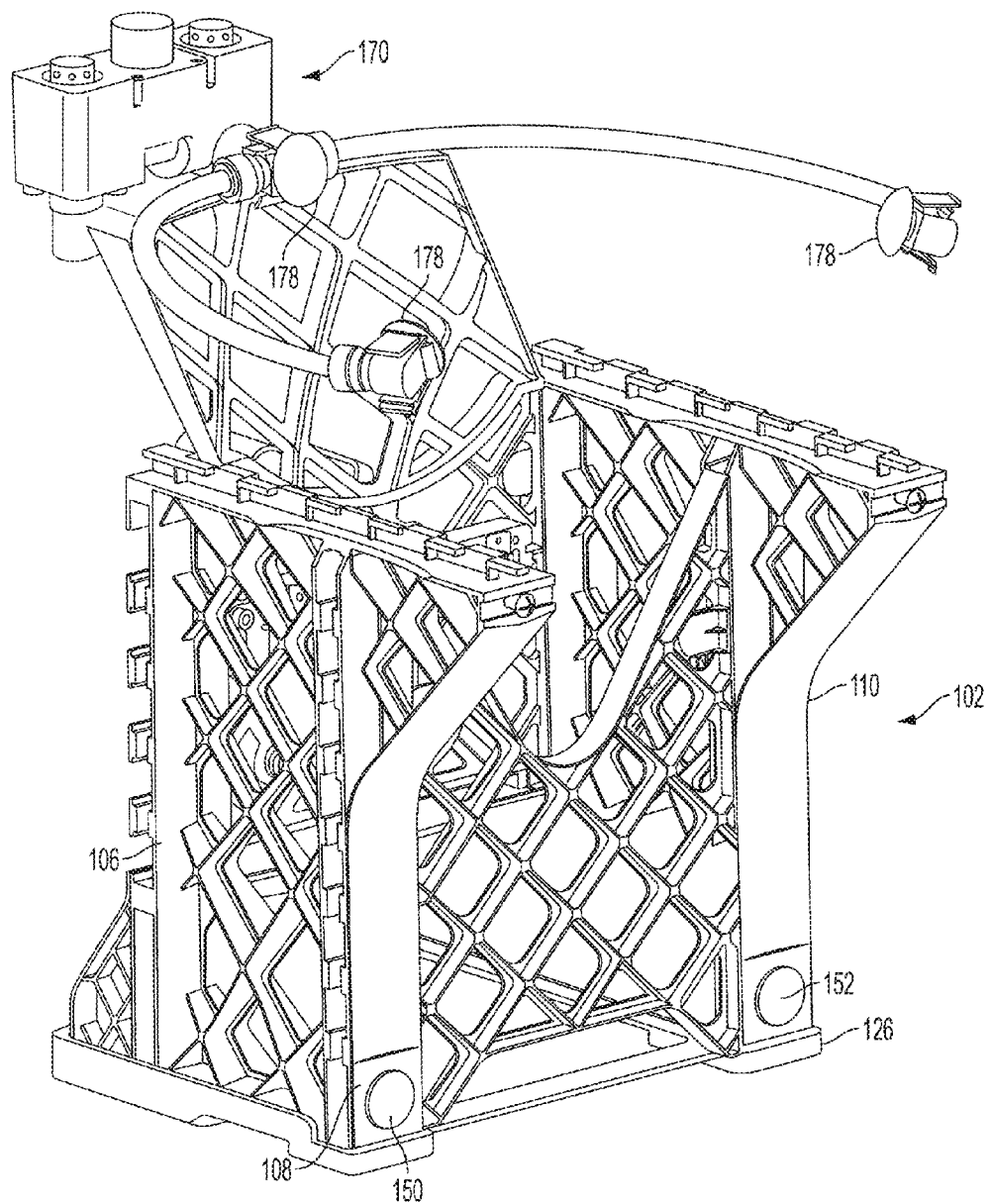
FIG. 16 is a perspective view of the base assembly of the vacuum waste system shown in FIG. 1 with the bowl assembly removed.
Figure 17:
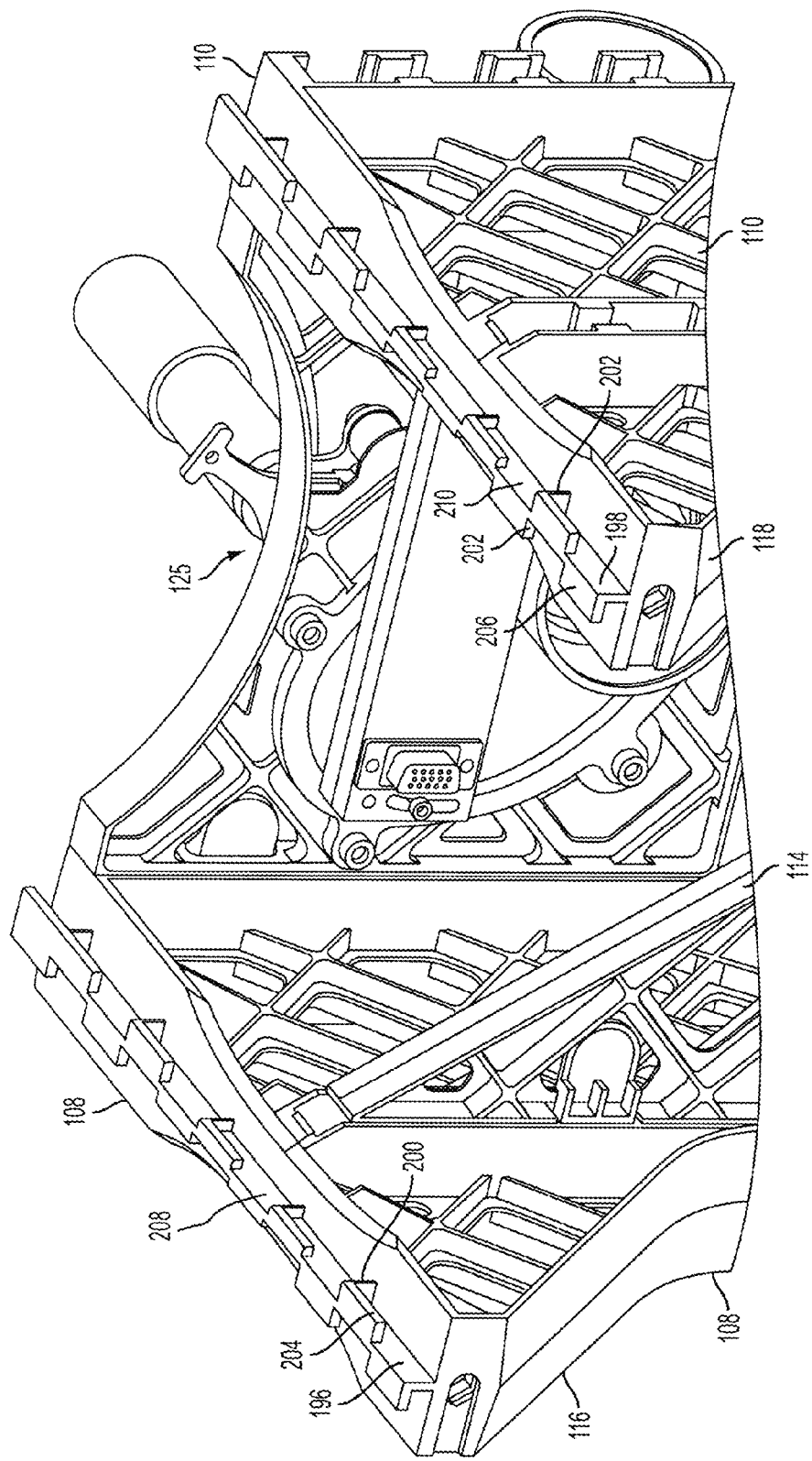
FIG. 17 is a derailed perspective view of the base assembly of the vacuum waste system shown in FIG. 1 with the bowl assembly removed.
Figure 18:
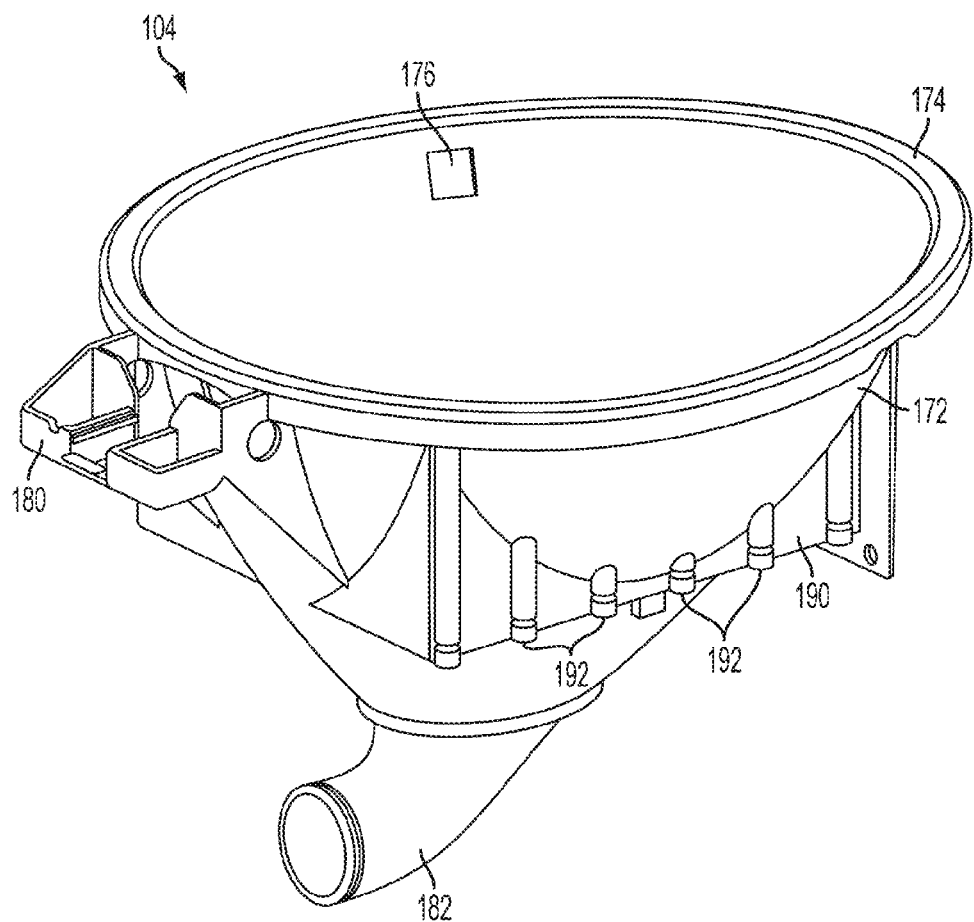
FIG. 18 is a rear perspective view of the bowl assembly of the vacuum waste system shown in FIG. 1.
Figure 19:
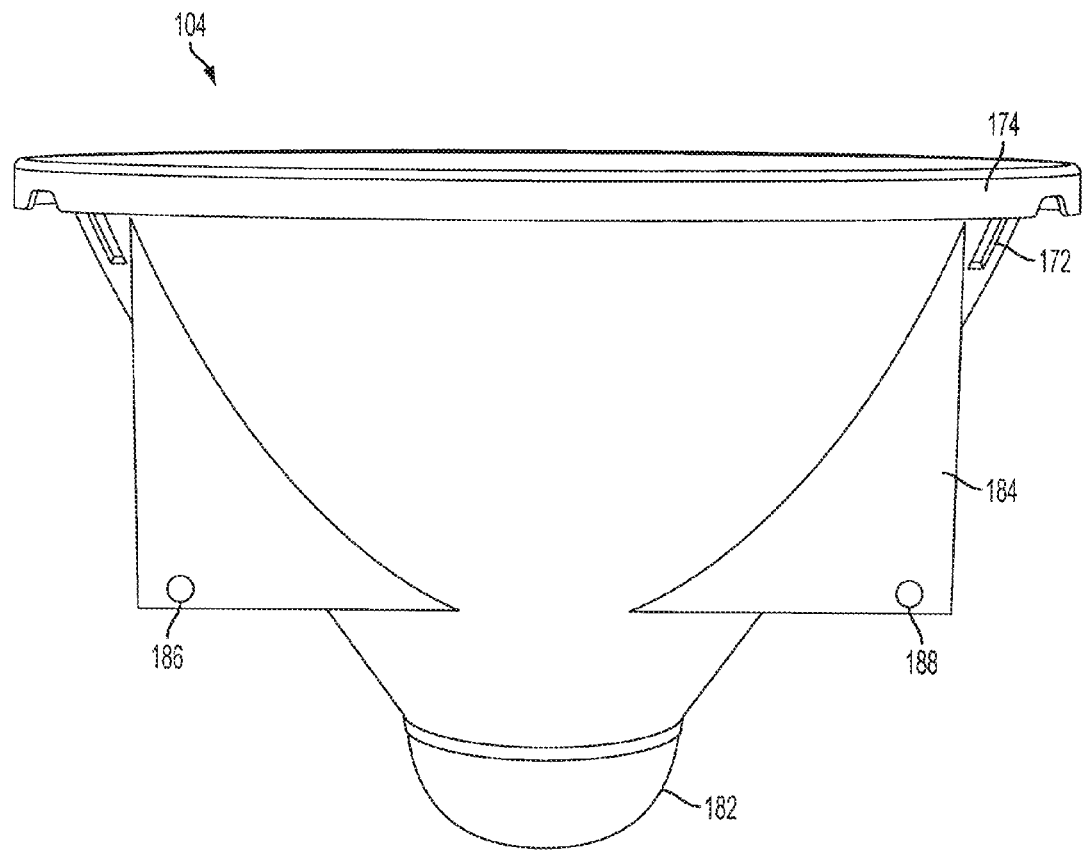
FIG. 19 is a front view of the bowl assembly of the vacuum waste system shown in FIG. 1.
Figure 20:
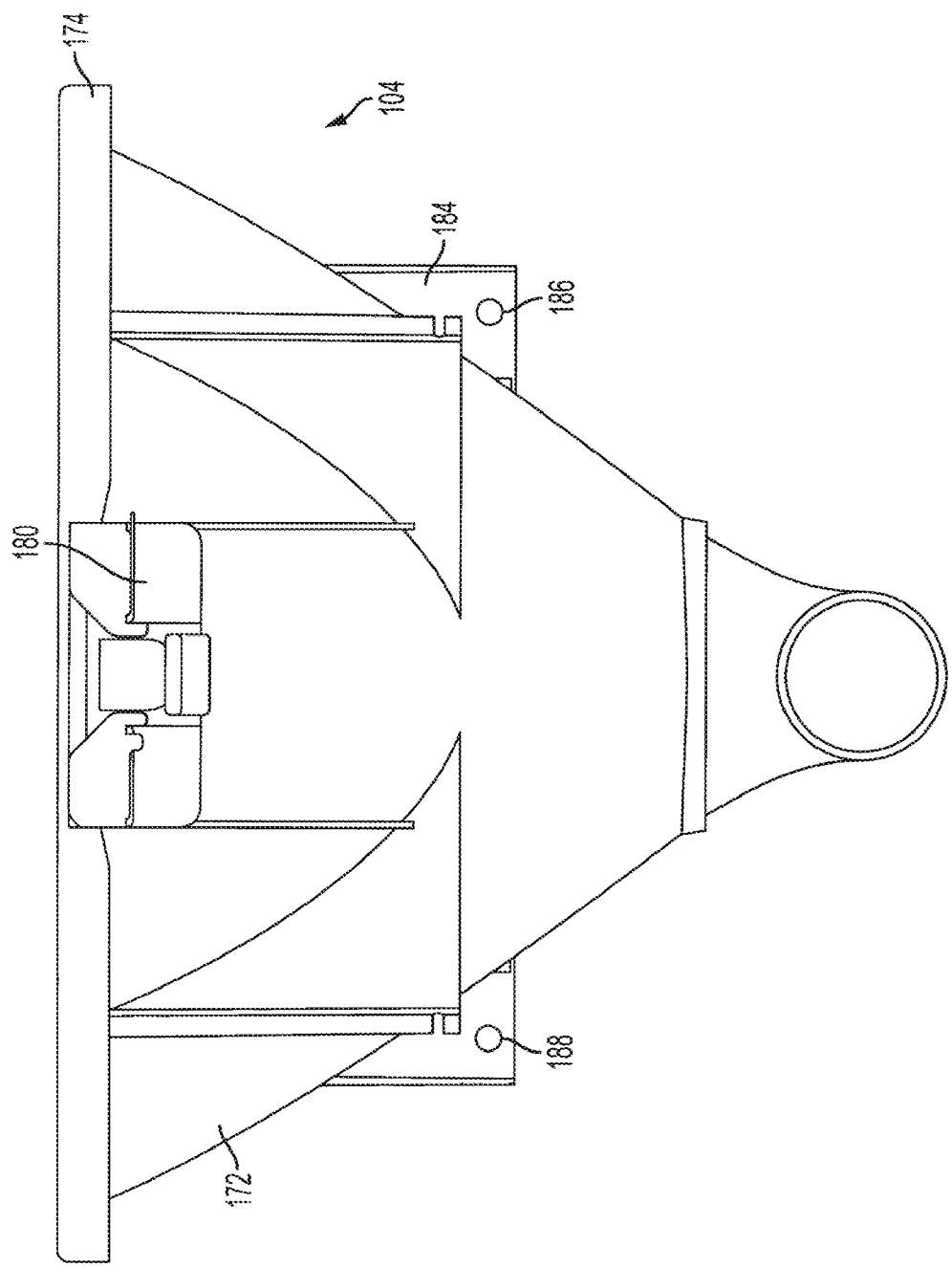
FIG. 20 is a rear view of the bowl assembly of the vacuum waste system shown in FIG. 1.

That is, as can be appreciated from FIG. 12, for example, to mate the base assembly 102 with the mounting member 126, the base assembly 102 is placed at an angle with respect to mounting member 126 so that the mounting extensions 132 and 134 can be received by recesses 136 and 138, respectively, as shown in FIG. 15. The base assembly 102 can then be rotated in a direction of arrow MOUNT as shown in FIG. 12 to move the front of the base assembly 102 into mating position with the mounting member 126. As further shown, the side walls 108 and 110 include respective downward projections 142 (only the downward projection 142 of side wall 110 is visible in FIGS. 12 and 14). The downward projections 142 each mate with respective recesses 144 in the mounting portions 128 and 130 (only recess 144 of mounting portion 130 is shown in FIGS. 12 and 14) to further secure the side walls 108 and 110 into mounting portions 128 and 130.

As further shown, in particular, in FIGS. 12 and 14, side walls 108 and 110 include flexible bayonet mounts 146 and 148 having buttons 150 and 152, respectively. As indicated, when the base assembly 102 is rotated in the direction of arrow MOUNT and the downward projections 142 are received into respective recesses 144, the edges 154 and 156 defining the fronts of openings 158 and 160, respectively, push the bayonet mounts 146 and 148 backward. As the base assembly 102 is further received in the mounting member 126, the tabs 162 and 164 of the bayonet mounts 146 and 148 pass the edges 154 and 156, in which event the resiliency of the bayonet mounts 146 and 148 spring the tabs 162 and 164 forward into recesses 166 and 168 below the edges 154 and 156, respectively, and thus removably lock the base assembly 102 into mating engagement with the mounting member 126 as shown.

As can be understood by one skilled in the art, to remove the base assembly 102 from the mounting member 126, pressure can be applied (e.g., manually) to buttons 150 and 152 to push the bayonet mounts 146 and 148 backward so that the tabs 162 and 164 become disengaged with the recesses 166 and 168, respectively. The base assembly 102 can then be rotated in a direction opposite to that of arrow MOUNT so that the bayonet mounts 146 and 148 can be removed from the openings 158 and 160 and the downward projections 142 can be removed from recesses 144. The base assembly 102 can then be moved in a direction opposite to arrow INSERT so that the mounting extensions 132 and 134 are removed from recesses 136 and 138, respectively, in which event the base assembly 102 can be removed from the mounting member 126.

Figure 33:
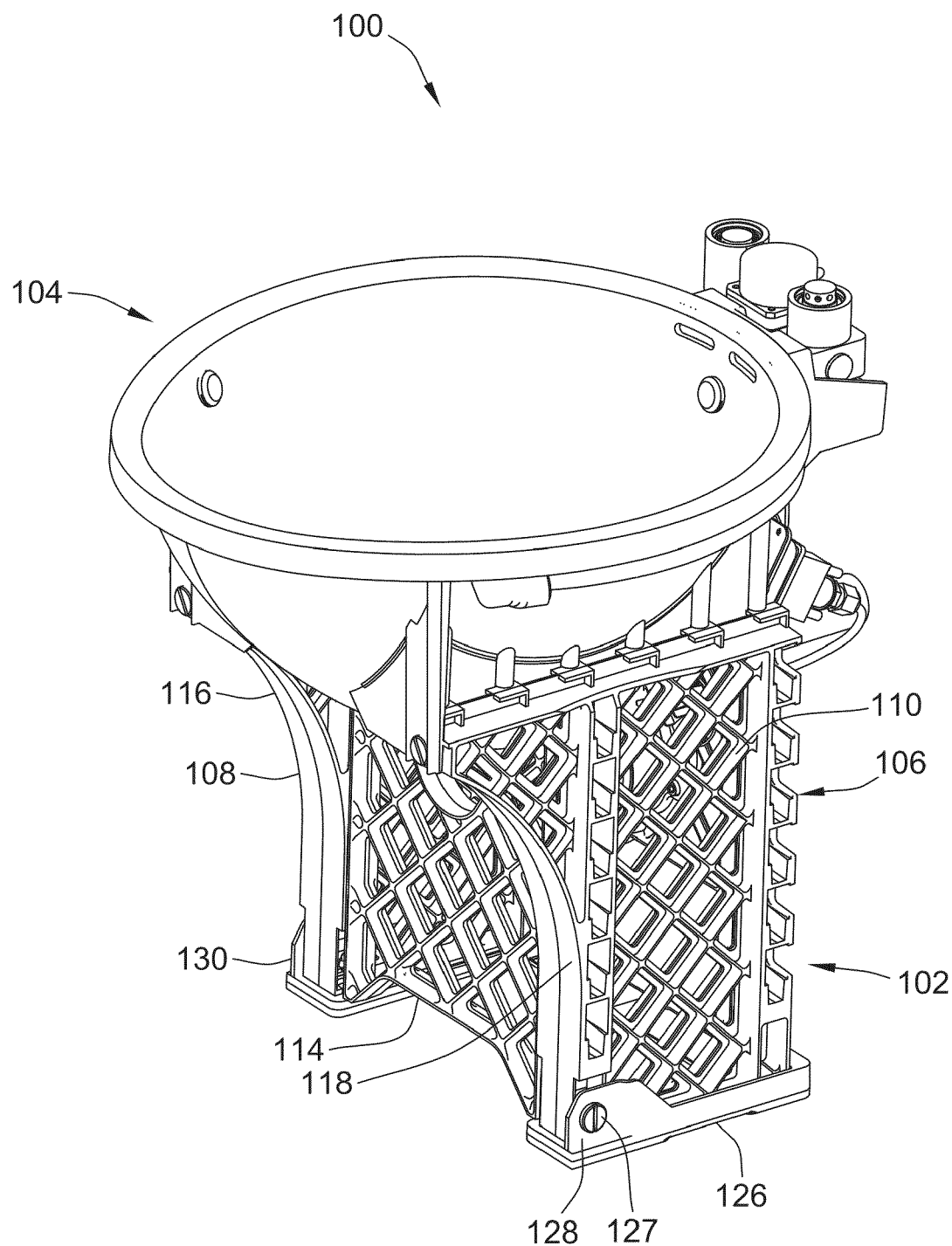
FIG. 33 is a front perspective view of a vacuum waste system according to an embodiment of the present invention.
Figure 34:
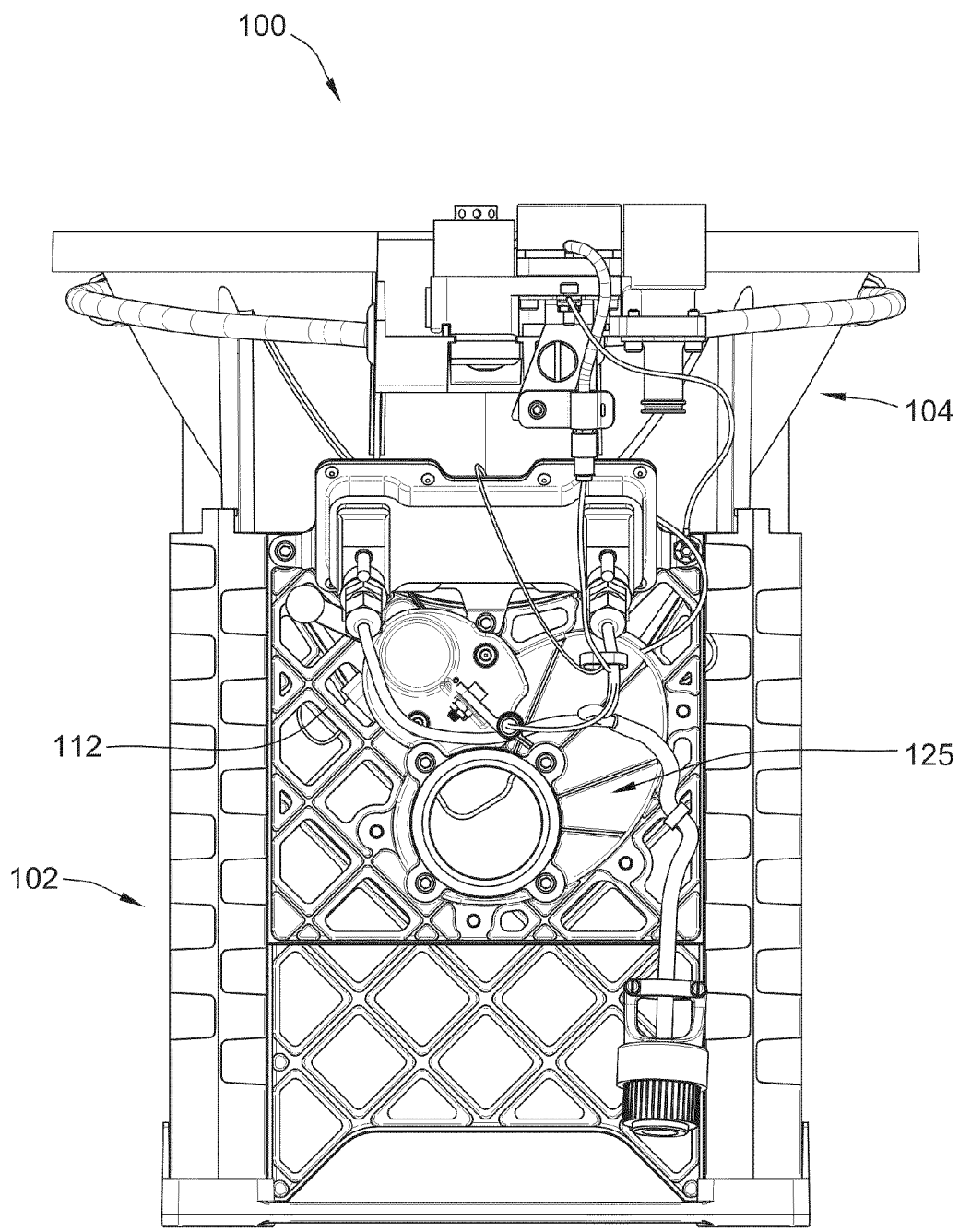
FIG. 34 is a rear view of a vacuum waste system according to an embodiment of the present invention illustrated in FIG. 33.

In another embodiment illustrated in FIG. 33, the base assembly 102 is placed into the mounting member 126 and a bolt 127, nut or other fastener secures the sidewalls 108, 110 of the frame structure into the mounting member 126 instead of the bayonet mounts of the previous embodiment. In a preferred embodiment, the fastener is a quarter turn locking screw used in conjunction with a self locking nut.

Figure 21:
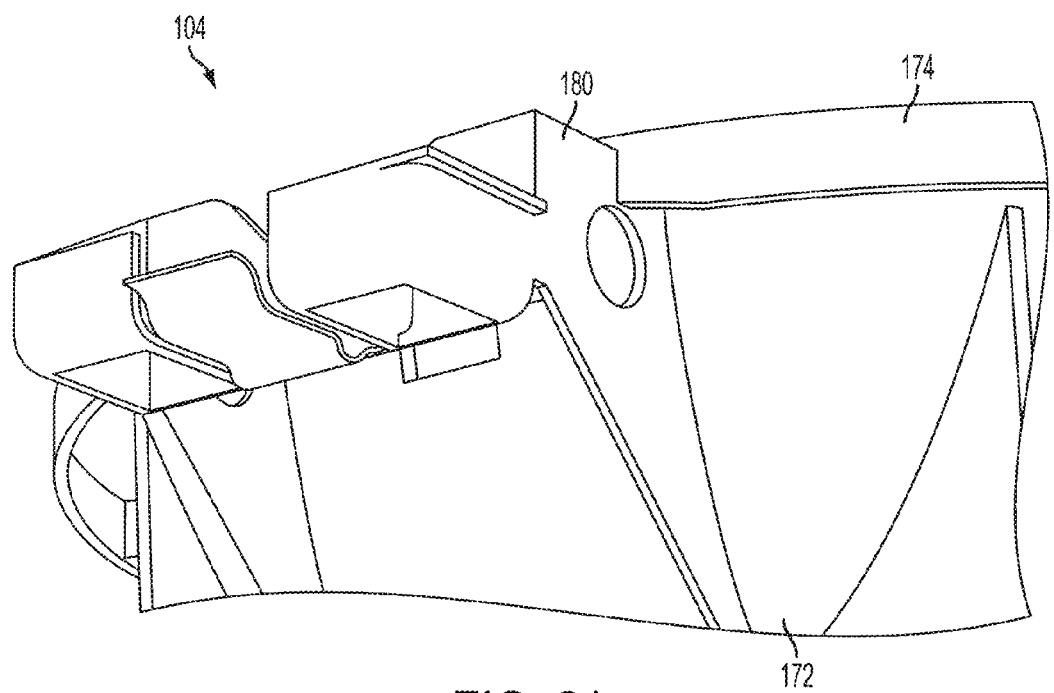
FIG. 21 is a detailed perspective view of the back of the bowl assembly of the vacuum waste system shown in FIG. 1.
Figure 22:
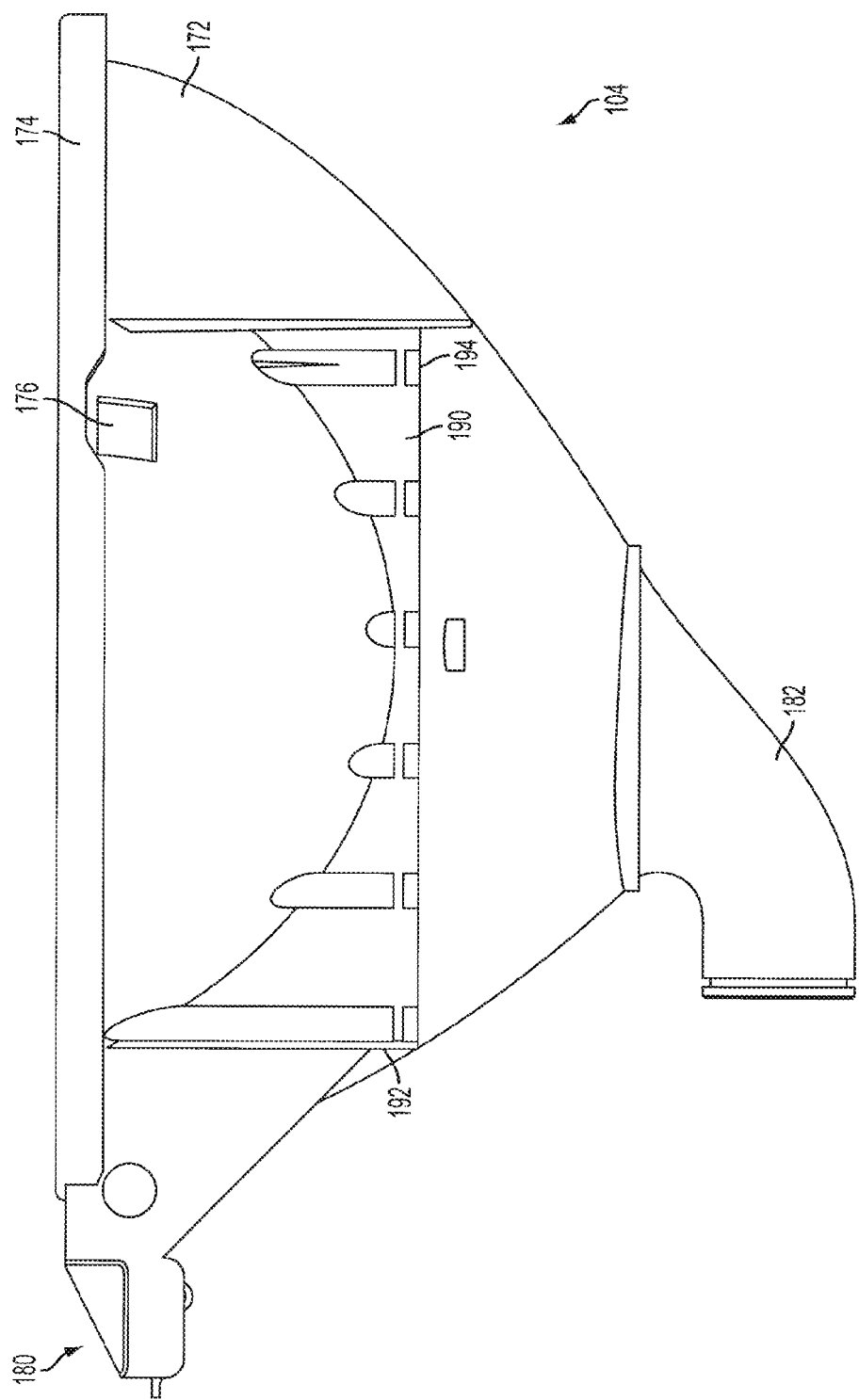
FIG. 22 is a side view of the bowl assembly of the vacuum waste system shown in FIG. 1.
Figure 23:
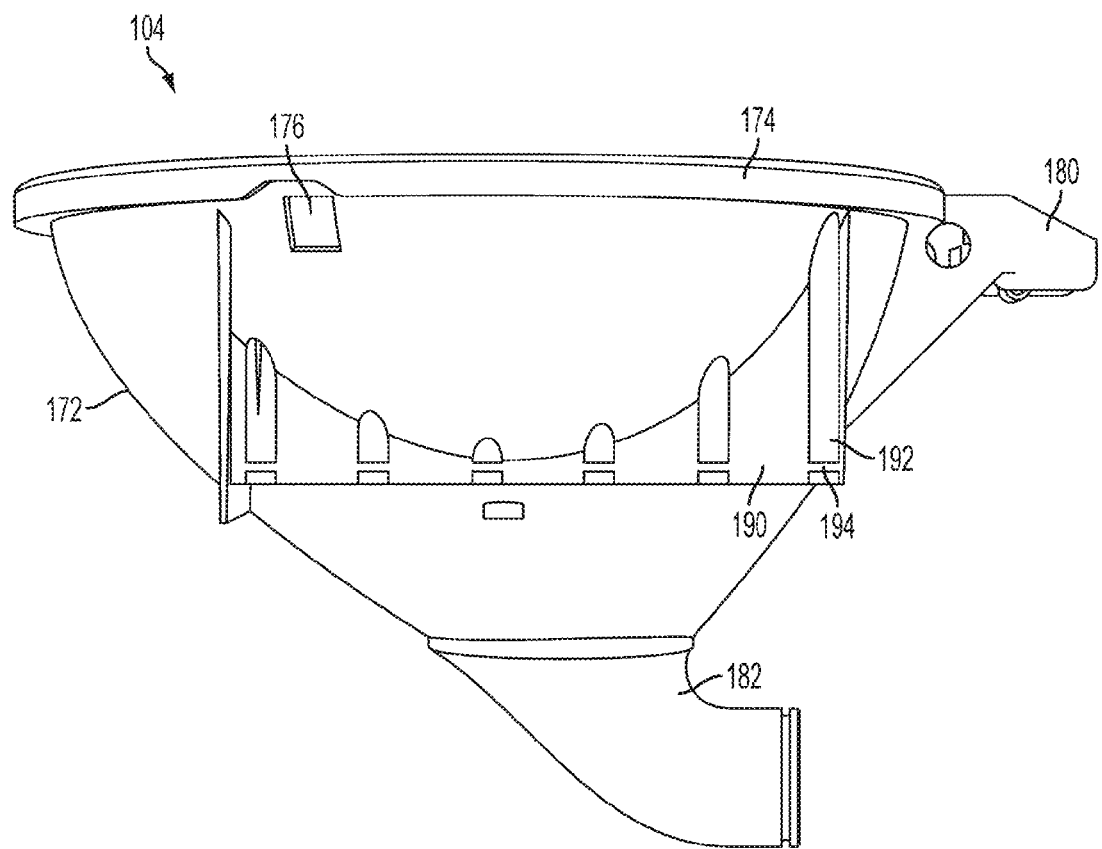
FIG. 23 is another side view of the bowl assembly of the vacuum waste system shown in FIG. 1.
Figure 24:
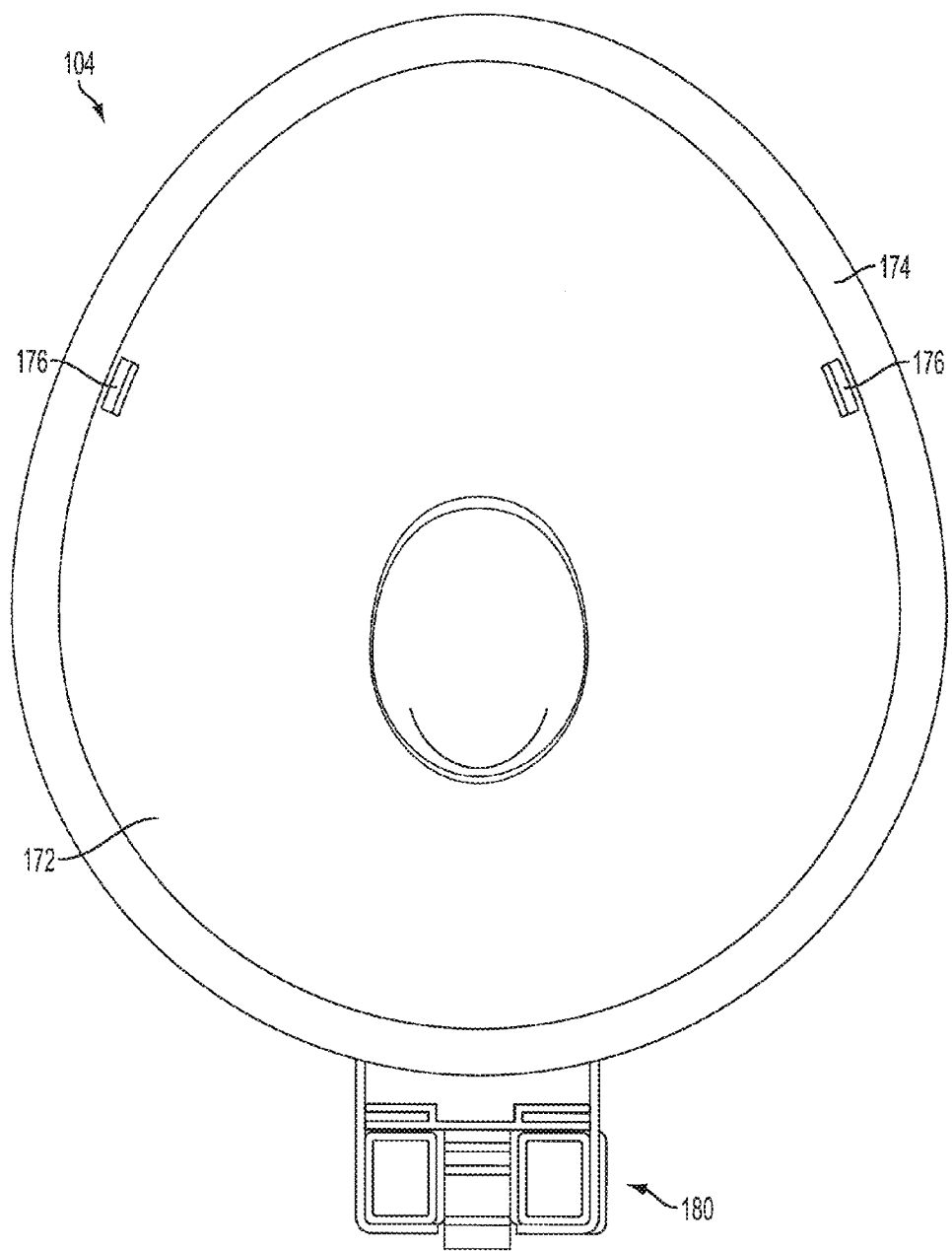
FIG. 24 is a top view of the bowl assembly of the vacuum waste system shown in FIG. 1.
Figure 25:
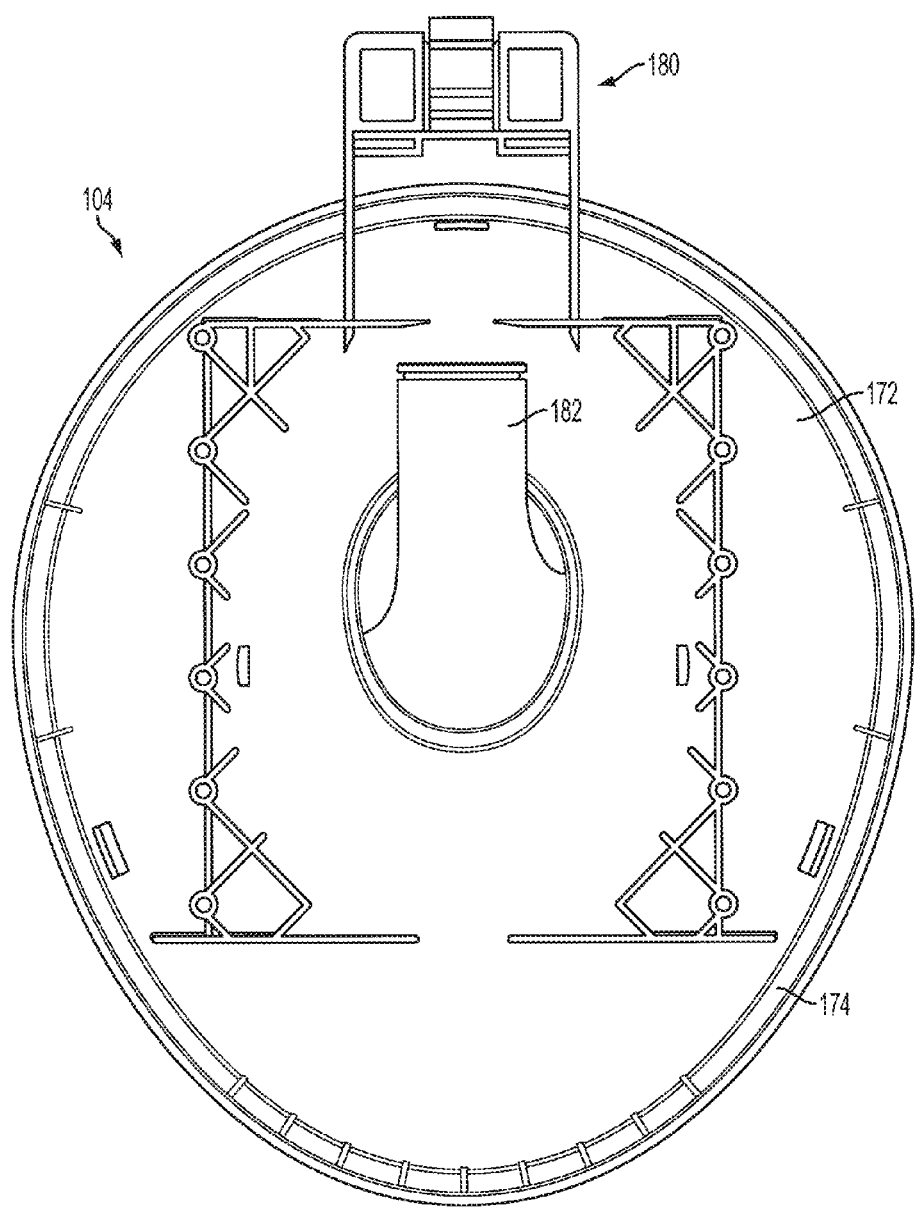
FIG. 25 is a bottom view of the bowl assembly of the vacuum waste system shown in FIG. 1.
Figure 26:
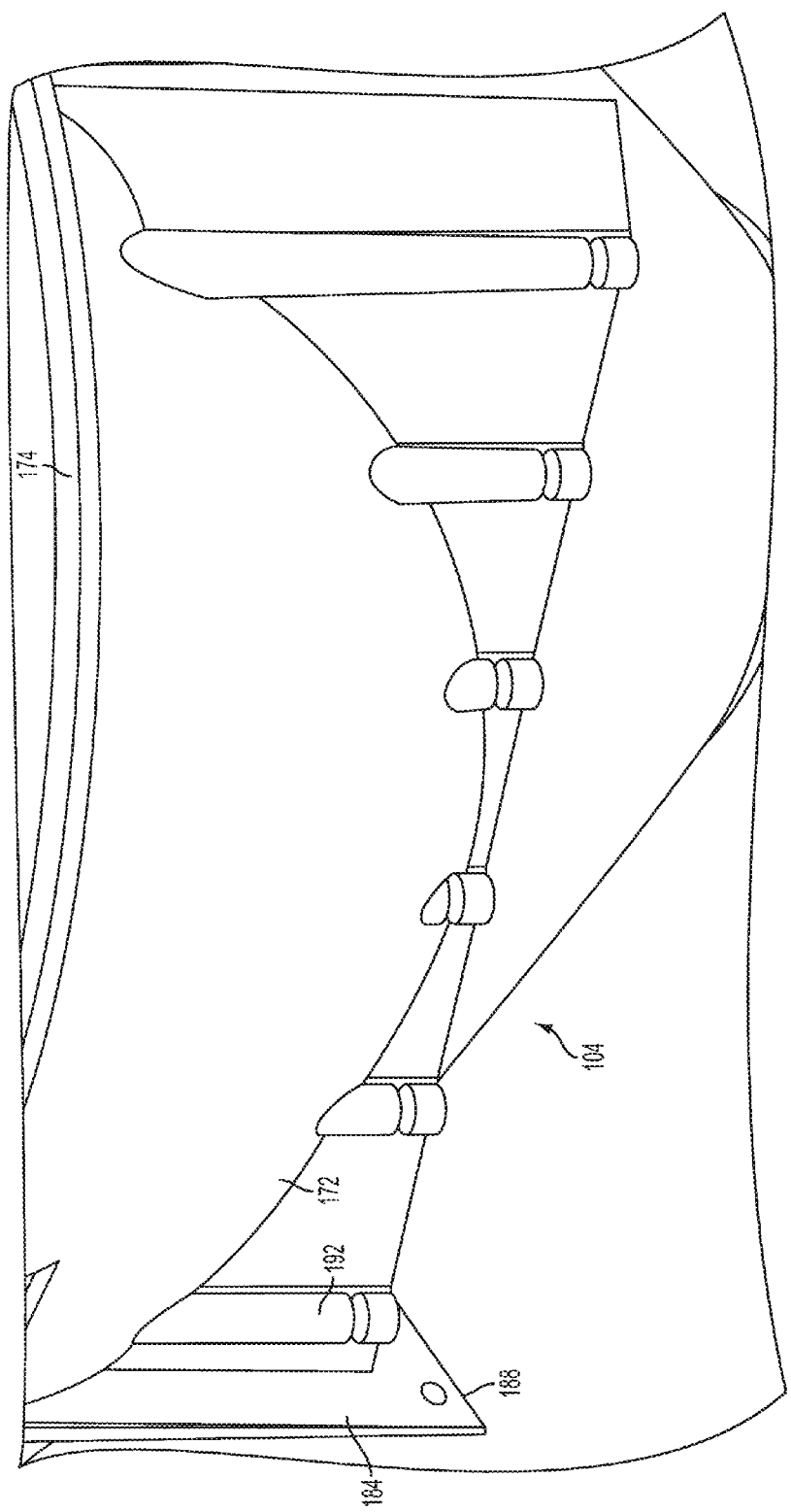
FIG. 26 is a detailed side perspective view of the bowl assembly of the vacuum waste system shown in FIG. 1.
Figure 27:
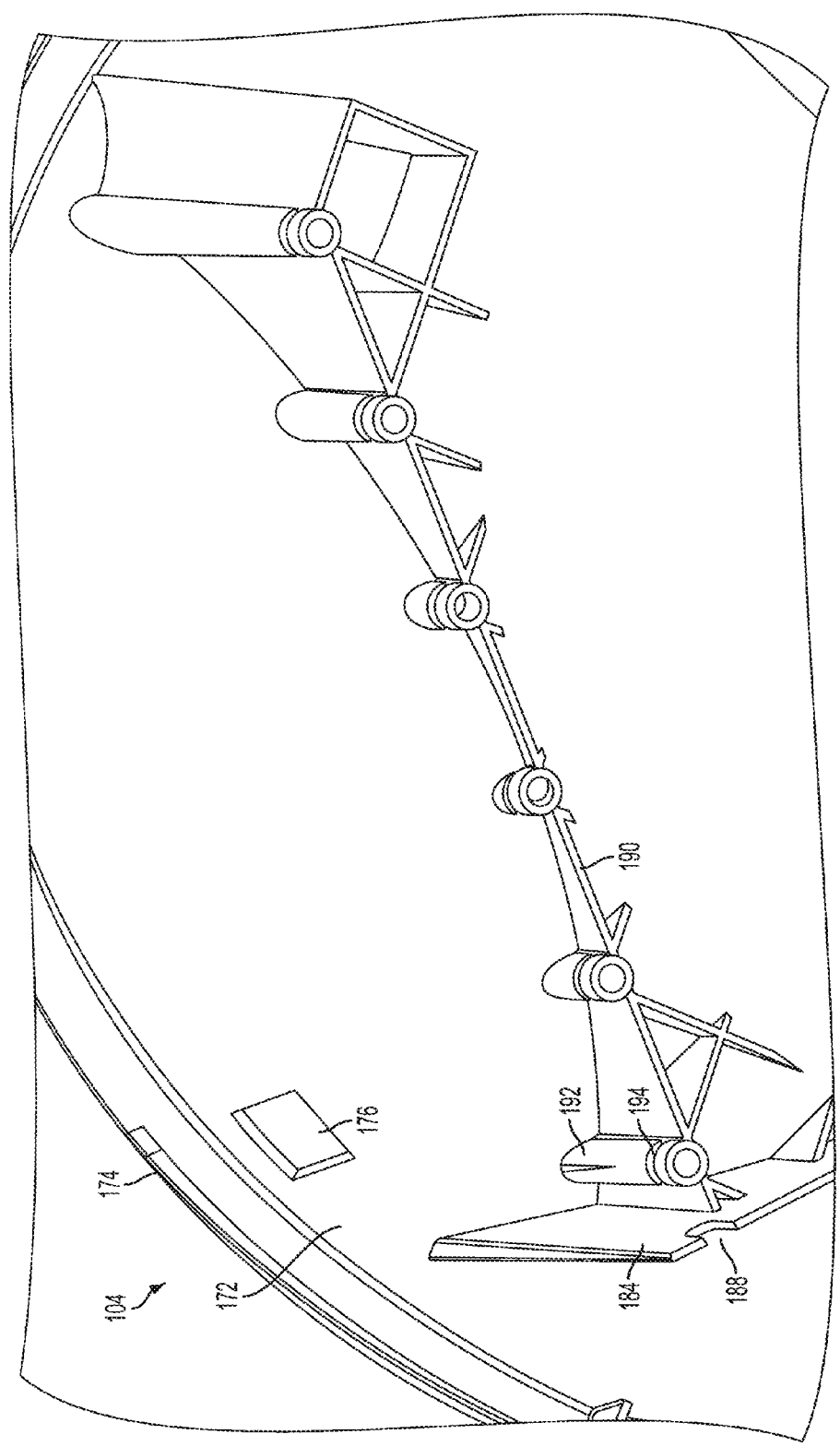
FIG. 27 is a detailed bottom perspective view of the bowl assembly of the vacuum waste system shown in FIG. 1.
Figure 28:
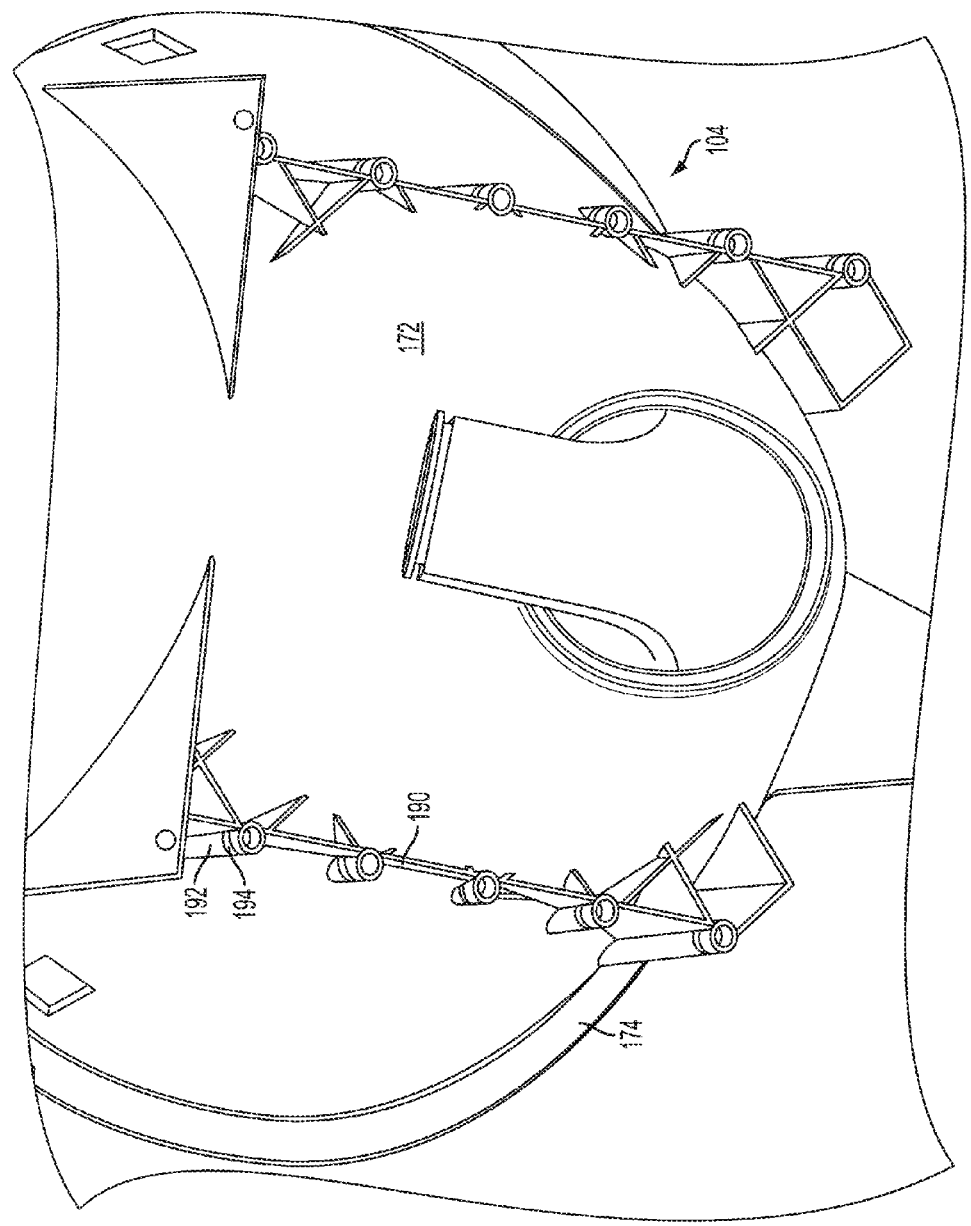
FIG. 28 is a further detailed bottom perspective view of the bowl assembly of the vacuum waste system shown in FIG. 1.

Details of bowl assembly 104 will now be described. As shown in FIGS. 1-8, the bowl assembly 104 removably mounts to the base assembly 102. The bowl assembly 104 is attached to a rinse assembly 170 which is shown in more detail in FIG. 16 and described in more detail in copending U.S. patent application entitled "Rinse Valve for Vacuum Waste System," Ser. No. 61/102,653, filed Oct. 3, 2008, the entire contents of which being incorporated herein by reference. As indicated in more detail in FIGS. 18-25, the bowl assembly 104 includes a bowl 172 having a rim 174. Openings 176 are positioned in the bowl to accommodate rinse outlets 178 of the rinse assembly 170 as would be understood by one skilled in the art. As shown in more detail in FIG. 21, the bowl assembly includes a mounting portion 180 to which the rinse valve of the rinse assembly 170 can mount.

As further shown in FIGS. 18-25, the bowl assembly 104 includes a drain 182 that drains the bowl 172 as controlled by the flush valve and vacuum generator assembly 125 discussed above. In particular, as shown, for example, in FIGS. 3 and 4, the drain 182 slides into the flush valve port of the flush valve assembly 125 which is shown, for example, in FIG. 17. The bowl assembly 104 also includes a front plate 184 having slots or openings 186 and 188 for receiving fasteners to secure the bowl assembly 104 to the base assembly 102 as discussed in more detail below. The bowl assembly 104 further includes a mounting assembly 190 that can be, for example, a downwardly extending member integral with the bowl 172. The mounting assembly 190 includes a plurality of columns 192 extending downwardly from the exterior surface of the bowl 172 as illustrated. The columns 192 can be hollow as in this example, or solid. Furthermore, each column 192 includes a gap 194 positioned at a predetermined distance from the bottom of the column 192.

An example of the manner in which bowl assembly 104 is removably mounted to the base assembly 102 will now be described with reference to FIGS. 29-32. As shown in detail in, for example, FIGS. 17 and 29-32, side walls 108 and 110 of frame structure 106 of the base assembly 102 include vertically extending walls 196 and 198, respectively. Vertical extending walls 196 and 198 each include a plurality of vertically extending members 200 and 202, respectively, extending from the outer and inner surfaces of vertical extending walls 196 and 198 at or about 90 degrees with respect to the inner and outer surfaces of the vertical extending walls 196 and 198. Also, vertical extending walls 196 and 198 each include a plurality of horizontally extending members 204 and 206, respectively, extending from the outer and inner surfaces of vertical extending walls 196 and 198 at or about 90 degrees with respect to the inner and outer surfaces of the vertical extending walls 196 and 198. Spaces 208 and 210 are thus formed between the horizontal extending members 204 and 206 as shown in detail in, for example, FIGS. 17, 29, 31 and 32.

Figure 29:
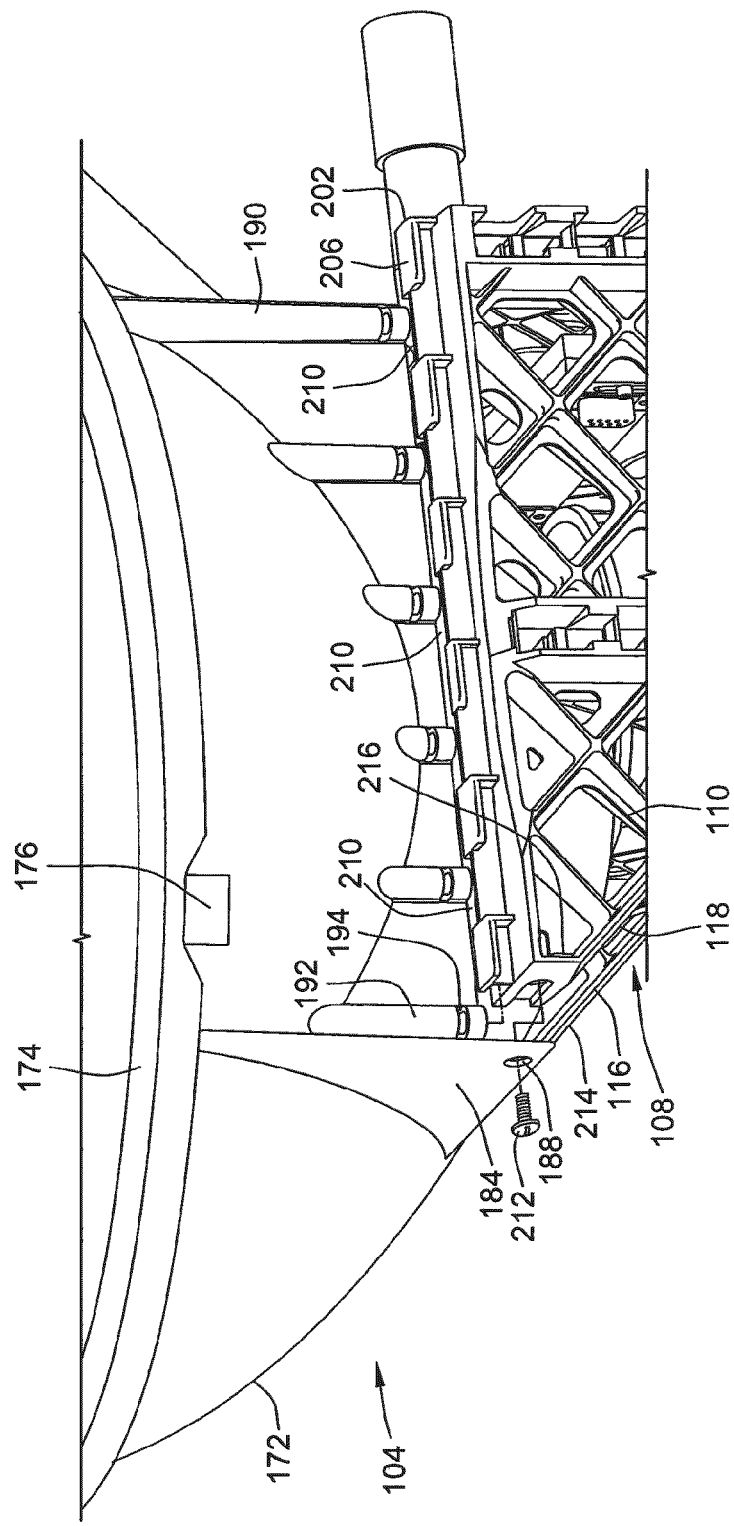
FIG. 29 is a detailed side view illustrating an example of the manner in which the bowl assembly mounts to the base assembly of the vacuum waste system shown in FIG. 1.
Figure 30:
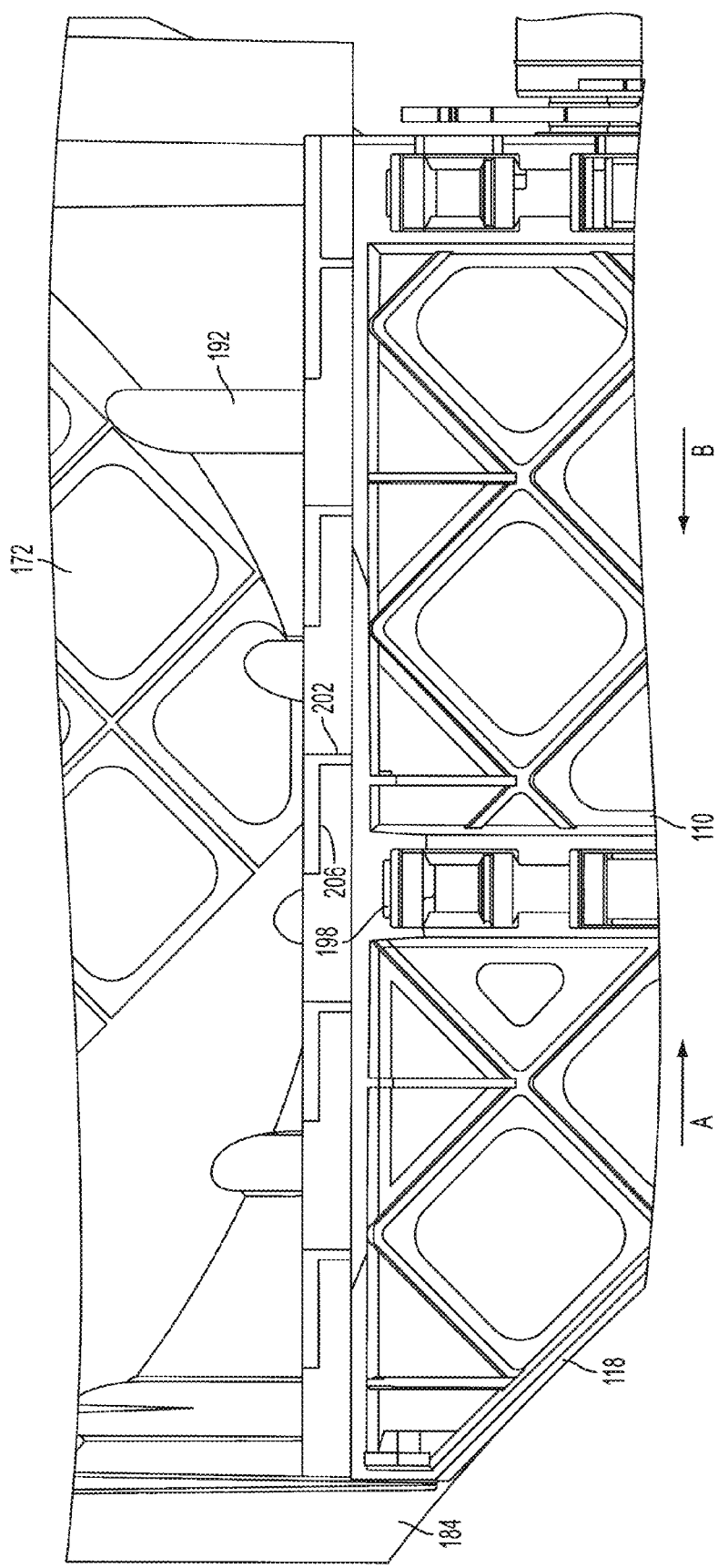
FIG. 30 is a further detailed side view illustrating an example of the manner in which the bowl assembly mounts to the base assembly of the vacuum waste system shown in FIG. 1.
Figure 31:
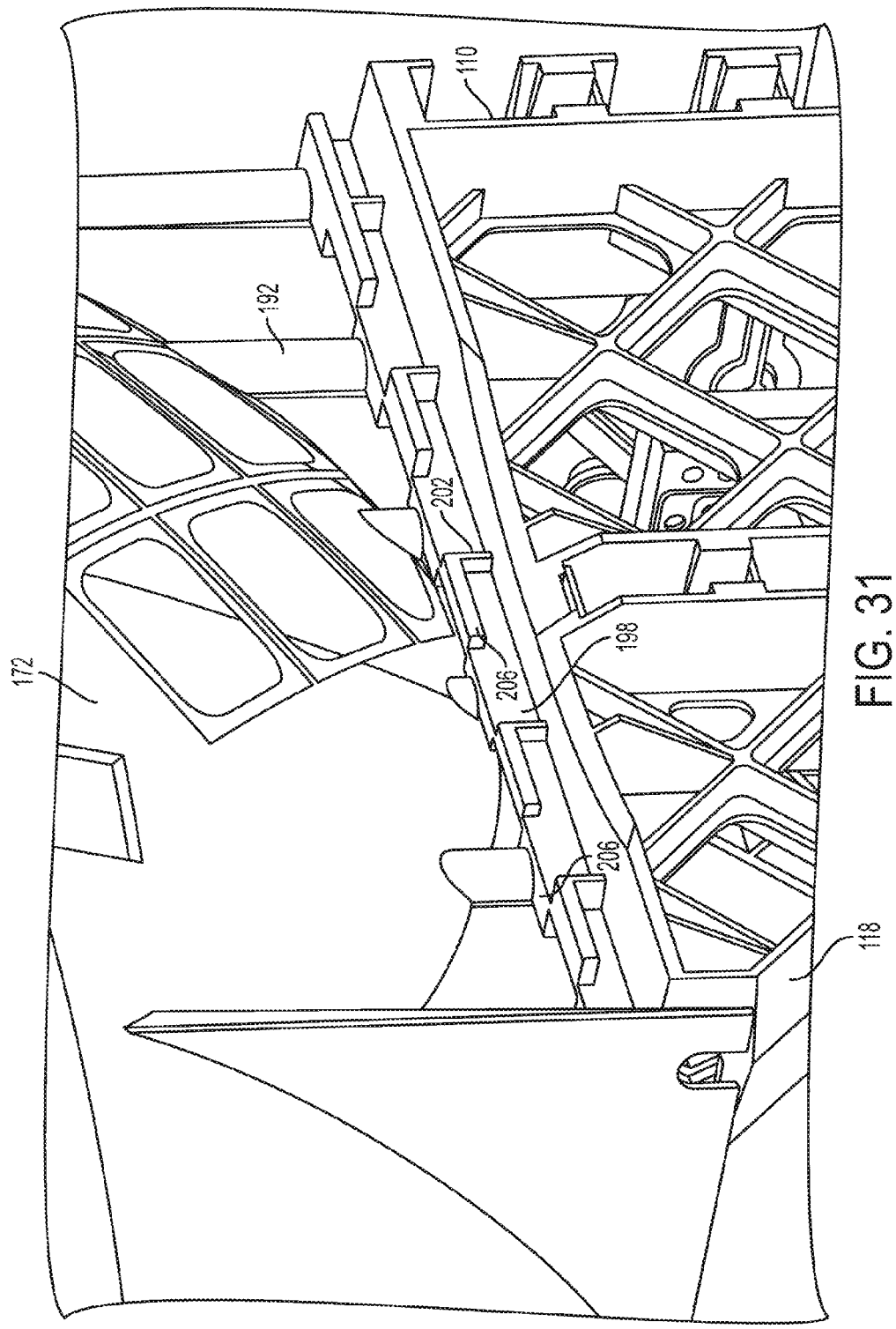
FIG. 31 is a front detailed perspective view illustrating an example of the manner in which the bowl assembly mounts to the base assembly of the vacuum waste system shown in FIG. 1.
Figure 32:
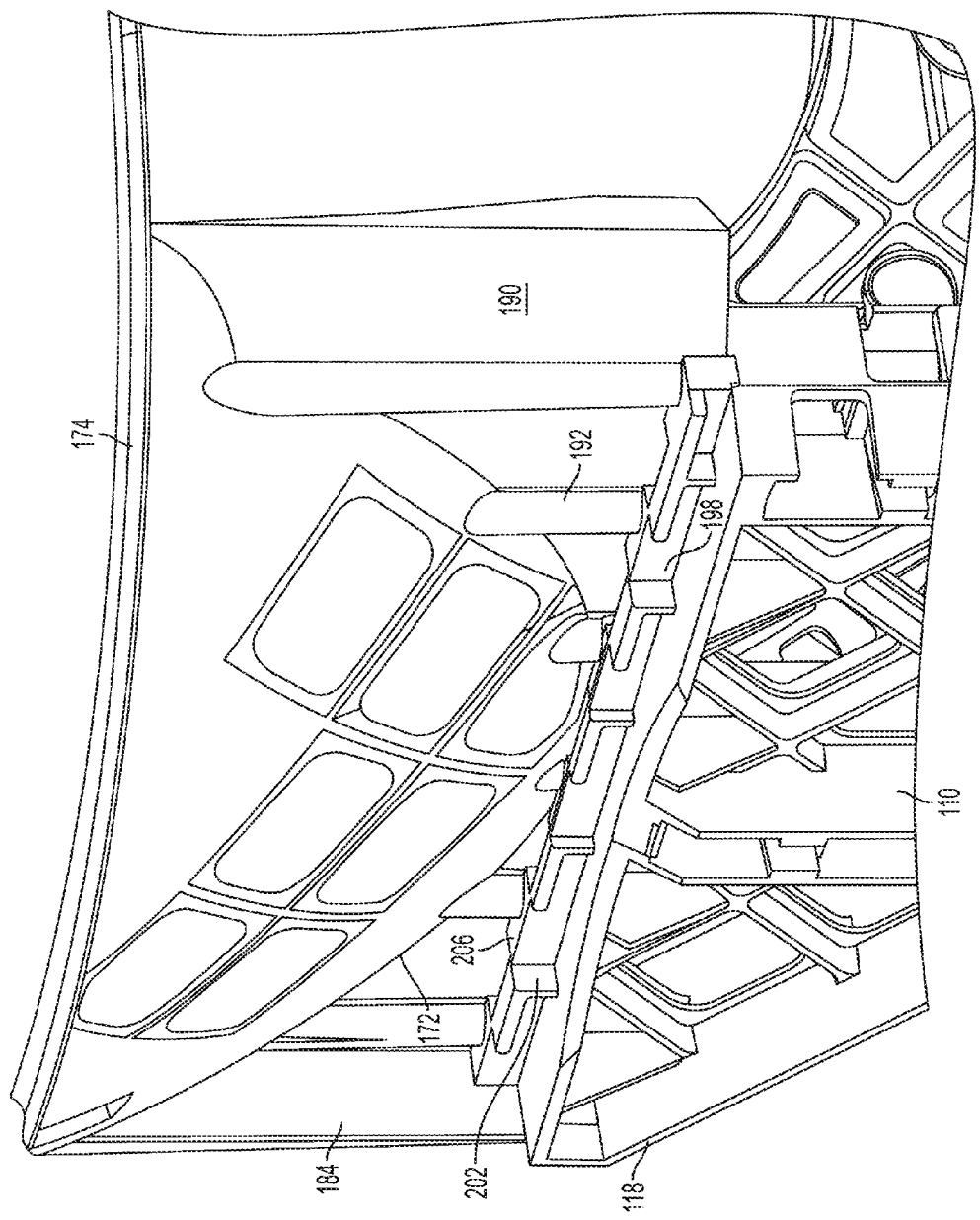
FIG. 32 is a rear detailed perspective view illustrating an example of the manner in which the bowl assembly mounts to the base assembly of the vacuum waste system shown in FIG. 1.

To mount the bowl assembly 104 to the base assembly 102, the bowl assembly 104 is placed as shown, for example, in FIGS. 29 and 30 where the columns 192 are positioned in the spaces 208 and 210 between the horizontal extending members 204 and 206 and the bottoms of the columns 192 rest on and are supported by the side walls 108 and 110. The, the bowl assembly 104 can be moved in a direction of Arrow A as shown in FIG. 30 so that a respective horizontal extending member 204 or 206 is received in a respective gap 194 (FIG. 29) in a respective column 192 as shown in FIGS. 31 and 32. Thus, the horizontal extending members 204 and 206 mate with the columns 192 and prevent the bowl assembly 104 from being lifted in a vertical direction off of the base assembly 102. Furthermore, the vertical extending walls 196 and 198 can contact the mounting assembly 190 of the bowl assembly 102 and thus prevent the bowl assembly 102 from being moved from side to side.

In addition, as shown in FIG. 29, a respective bolt 212 can be passed through each of the slots or openings 186 and 188 in the front plate 184 and through a respective opening 214 in the front of each of the side walls 108 and 110 of frame assembly 106. A respective nut 216, which can be a self-locking nut, etc., is then attached to each of the bolts 212 to thus secure the bowl assembly 104 to the base assembly 102. It should be particularly noted that the bolt 212 and nut 216 assemblies thus require tools to secure the bowl assembly 104 to the base assembly 102 and to remove the bowl assembly 104 from the base assembly 102. That is, the heads of the bolts 212 can be configured to accommodate a flathead or Phillips head screwdriver, an Allan wrench or hex key wrench, or a specially configured tool, that is used to unscrew the bolt 212 from its respective nut 216. It may also be necessary to use a wrench to hold the nut 216 when the bolt is being unscrewed 212. Thus, the bolt 212 and nut 216 assemblies prevent the bowl assembly 104 from being removed from the base assembly 102 simply with free hands, but rather, require the use of some type of tool.

To remove the bowl assembly 104 from the base assembly 102, the appropriate tool or combination of tools is used remove the bolts 212. Once the bolts have been removed, the bowl assembly 104 can be moved in the direction of Arrow B in FIG. 30 until the columns 192 are each within a respective one of the spaces 208 or 210. At this time, the columns 192 are no longer engaged by the horizontal extending members 204 and 206, and thus, the bowl assembly 104 can be lifted off of the base 102.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. It should be understood that the illustrated embodiments are exemplary only, and should not be taken as limiting the scope of the invention.

What is claimed is:

1. A vacuum waste assembly, comprising:
    a base assembly comprising at least one side wall having a vertically extending wall extending from a top surface of the side wall, the vertically extending wall having a plurality of horizontally extending members extending therefrom, the horizontally extending members being positioned such that respective spaces are formed between the horizontally extending members; and
    a toilet bowl assembly having a toilet bowl and a plurality of downwardly extending members extending therefrom, each of the downwardly extending members positioned in correspondence with a respective one of the horizontally extending members of the base assembly and having a gap therein to receive and mate with the respective one of the horizontally extending members,
    such that when the toilet bowl assembly is mounted to the base assembly, a respective downwardly extending member passes into a respective space formed between the horizontally extending members, and a respective one of the horizontally extending members between which the respective space is formed is received into and mates with the gap of the respective downwardly extending member to thus removably secure the toilet bowl assembly to the base assembly and prevent the toilet bowl assembly from being lifted in a vertical direction off the base assembly.

2. The vacuum waste assembly of claim 1, wherein:
    when the toilet bowl assembly is removably secured to the base assembly, a respective bottom of each of the downwardly extending members contacts a surface of the side wall, such that the side wall supports the toilet bowl assembly.

3. The vacuum waste assembly of claim 1, wherein:
    the base assembly comprises a plurality of said side walls, each having a respective said vertically extending wall extending from its respective top surface, the vertically extending wall having a plurality of the horizontally extending members extending therefrom, the horizontally extending members being positioned such that said respective spaces are formed between the horizontally extending members; and
    when the toilet bowl assembly is mounted to the base assembly, a respective one of the horizontally extending members extending from each of the vertically extending walls is received into a respective said gap to thus removably secure the toilet bowl assembly to the base assembly.

4. The vacuum waste assembly of claim 1, further comprising:
    a fastening member that is operated by a tool to further secure the toilet bowl assembly to the base assembly.

5. The vacuum waste assembly of claim 1, further comprising:
    a mounting member for mounting the vacuum waste assembly into a vehicle, the mounting member comprising a mounting portion to which the base assembly removably couples, the mounting portion having a horizontally-oriented recess and a vertically-oriented recess,
    the base assembly further comprising:
        a horizontally extending mounting extension that mates with the horizontally-oriented recess in the mounting portion, and
        a downward projection that mates with the vertically-oriented recess in the mounting portion.

6. The vacuum waste assembly of claim 5, wherein:
    the base assembly further comprises a bayonet mount that mates with the mounting portion.

7. The vacuum waste assembly of claim 1, wherein:
    when the toilet bowl assembly is mounted to the base assembly, the toilet bowl assembly is horizontally slid with respect to the base assembly so that the respective one of the horizontally extending members between which the respective space is formed is slidably engaged with the gap of the respective downwardly extending member to thus removably secure the toilet bowl assembly to the base assembly.

8. The vacuum waste assembly of claim 1, wherein:
    the vertically extending wall further comprises a plurality of vertically extending members associated with the horizontally extending members, the vertically extending members limiting an amount by which the toilet bowl assembly can be horizontally slid along a surface of the side wall when the downwardly extending members contact the top surface of the side wall.

9. A method for assembling a vacuum waste assembly, comprising:
    lowering a toilet bowl assembly onto a base assembly, the base assembly comprising at least one side wall having a vertically extending wall extending from a top surface of the side wall, the vertically extending wall having a plurality of horizontally extending members extending therefrom, the horizontally extending members being positioned such that respective spaces are formed between the horizontally extending members, the toilet bowl assembly comprising a toilet bowl and a plurality of downwardly extending members extending therefrom, each of the downwardly extending members having a gap therein;
    positioning each of the downwardly extending members of the toilet bowl assembly in correspondence with a respective one of the horizontally extending members of the base assembly;
    downwardly passing a respective downwardly extending member of the toilet bowl assembly into a respective space formed between the horizontally extending members of the base assembly;
    horizontally sliding the respective downwardly extending member of the toilet bowl assembly in a first direction toward a respective one of the horizontally extending members between which the respective space is formed; and receiving the respective one of the horizontally extending members into the gap within the respective downwardly extending member to mate the respective downwardly extending member with the respective one of the horizontally extending members, and thus removably secure the toilet bowl assembly to the base assembly and prevent the toilet bowl assembly from being lifted in a vertical direction off the base assembly.

10. The method of claim 9, further comprising supporting the toilet bowl assembly on the side wall by a respective bottom of each of the downwardly extending members contacting a surface of the side wall when the toilet bowl assembly is removably secured to the base assembly.

11. The method of claim 9, wherein:
the base assembly comprises a plurality of said side walls, each having a respective said vertically extending wall extending from a respective top surface of the respective side wall, the vertically extending wall having a plurality of the horizontally extending members extending therefrom, the horizontally extending members being positioned such that said respective spaces are formed between the horizontally extending members; and the receiving step comprises receiving a respective one of the horizontally extending members extending from each of the vertically extending walls into a respective said gap to thus removably secure the toilet bowl assembly to the base assembly.

12. The method of claim 9, further comprising:
using a tool to couple a fastening member to the base assembly and the toilet bowl assembly to further secure the toilet bowl assembly to the base assembly.

13. The method of claim 9, further comprising:
mounting the base assembly on a mounting member that is secured to a vehicle, the mounting comprising:
placing the base assembly at an angle with respect to the mounting member such that a horizontally extending mounting extension of the base assembly is received by a horizontally-oriented recess of a mounting portion of the mounting member; and
rotating the base assembly to move a downward projection of the base assembly into a mating position with a respective vertically-oriented recess in the mounting portion.

14. The method of claim 13, wherein mounting the base assembly further comprises:
pushing a bayonet mount of the base assembly into an opening in the mounting portion; and
resiliently springing a tab from the bayonet mount into a recess in the opening of the mounting portion to removably lock the base assembly into mating engagement with the mounting member.

15. The method of claim 9, wherein:
the horizontally sliding step comprises sliding the toilet bowl assembly with respect to the base assembly so that said respective one of the horizontally extending members is slidably engaged with said respective said gap to thus removably secure the toilet bowl assembly to the base assembly.

16. The method of claim 9, further comprising:
unmounting the toilet bowl assembly from the base assembly by:
horizontally sliding the respective downwardly extending member of the toilet bowl assembly in a second direction away from the respective one of the horizontally extending members between which the respective space is formed so that the respective one of the horizontally extending members is slidably disengaged from the gap of the respective downwardly extending member; and
lifting the toilet bowl assembly in a substantially vertical direction away from the base assembly.

17. The method of claim 9, wherein:
the vertically extending wall further comprises a plurality of vertically extending members associated with the horizontally extending members, the vertically extending members limiting an amount by which the toilet bowl assembly can be slid along a surface of the side wall when the downwardly extending members contact the top surface of the side wall.

18. A vacuum waste assembly, comprising:
a base plate, secured to a vehicle and having at least one mounting area;
a base assembly comprising at least one side wall having a vertically extending wall extending from a top surface of the side wall, the vertically extending wall having a plurality of horizontally extending members extending therefrom, the horizontally extending members being positioned such that respective spaces are formed between the horizontally extending members; and
a toilet bowl assembly having a toilet bowl and a plurality of downwardly extending members extending therefrom, each of the downwardly extending members positioned in correspondence with a respective one of the horizontally extending members of the base assembly and having a gap therein to receive and mate with the respective one of the horizontally extending members, such that when the toilet bowl assembly is mounted to the base assembly, a respective downwardly extending member passes into a respective space formed between the horizontally extending members, and a respective one of the horizontally extending members between which the respective space is formed is received into and mates with the gap of the respective downwardly extending member to thus removably secure the toilet bowl assembly to the base assembly and prevent the toilet bowl assembly from being lifted in a vertical direction off the base assembly,
the base assembly further comprising a fastener removably coupling the base assembly to the base plate.

19. The vacuum waste assembly of claim 18, wherein the fastener is a bayonet mount that mates with the mounting area.

20. The vacuum waste assembly of claim 19, wherein:
the base plate further includes at least one recess therein; and
the base assembly further comprises a mounting extension that mates with the recess when the base assembly is removably coupled to the base plate.

21. The vacuum waste assembly of claim 18, wherein the fastener is a quarter turn locking screw used in conjunction with a self locking feature.

22. The vacuum waste assembly of claim 6, wherein the bayonet mount comprises a tab that springs horizontally into a recess in an opening of the mounting portion that mates with the bayonet mount.

23. The vacuum waste assembly of claim 22, wherein the bayonet mount comprises a button that disengages the tab from the recess in the opening of the mounting portion when the button is pressed.

24. The vacuum waste assembly of claim 1, wherein at least a portion of the side wall has an open lattice structure.

25. The method of claim 14, further comprising:

pressing a button of the bayonet mount to disengage the tab from the recess in the opening of the mounting portion;

rotating the base assembly to remove the bayonet mount from the opening of the mounting portion and move the downward projection of the base assembly upward to disengage from the vertically-oriented recess in the mounting portion;

removing the horizontally extending mounting extension from the horizontally-oriented recess; and removing the base assembly from the mounting member.

* * * * *